United States Patent [11] 3,614,740

[72] Inventors Bruce A. Delagi
Acton;
Harold L. McFarland, Jr., Concord; James F. O'Loughlin, Westford, all of Mass.
[21] Appl. No. 21,957
[22] Filed Mar. 23, 1970
[45] Patented Oct. 19, 1971
[73] Assignee Digital Equipment Corporation
Maynard, Mass.

[54] DATA PROCESSING SYSTEM WITH CIRCUITS FOR TRANSFERRING BETWEEN OPERATING ROUTINES, INTERRUPTION ROUTINES AND SUBROUTINES
33 Claims, 18 Drawing Figs.

[52] U.S. Cl. ........ 340/172.5
[51] Int. Cl. ........ G06f 9/12
[50] Field of Search ........ 340/172.5

[56] References Cited

UNITED STATES PATENTS

| | | | |
|---|---|---|---|
| 3,059,222 | 10/1962 | Demmer | 340/172.5 |
| 3,245,044 | 4/1966 | Meade et al. | 340/172.5 |
| 3,292,155 | 12/1966 | Neilson | 340/172.5 |
| 3,348,211 | 10/1967 | Ghiron | 340/172.5 |
| 3,359,544 | 12/1967 | Macon et al. | 340/172.5 |
| 3,480,917 | 11/1969 | Day | 340/172.5 |

*Primary Examiner*—Gareth D. Shaw
*Assistant Examiner*—Sydney R. Chirlin
*Attorney*—Cesari and McKenna

ABSTRACT: A data processing system processor unit for executing instructions from one of a plurality of partially completed operating routines. With each subroutine transfer a first register provides memory location address for storing a second register contents. The program count is stored in the second register; and the first subroutine instruction address is transferred to the program counter. A last subroutine instruction moves the second register contents to the program counter and the memory location contents to the second register. When an interruption routine is started, the contents of the program counter and a status register are transferred directly into a pair of memory locations defined by addresses from the first register. A last interruption routine instruction moves the contents of the two memory locations defined by addresses from the first register to the processor unit. The last operating routine to be started is always the first one to be completed so that any number of routines may be partially completed.

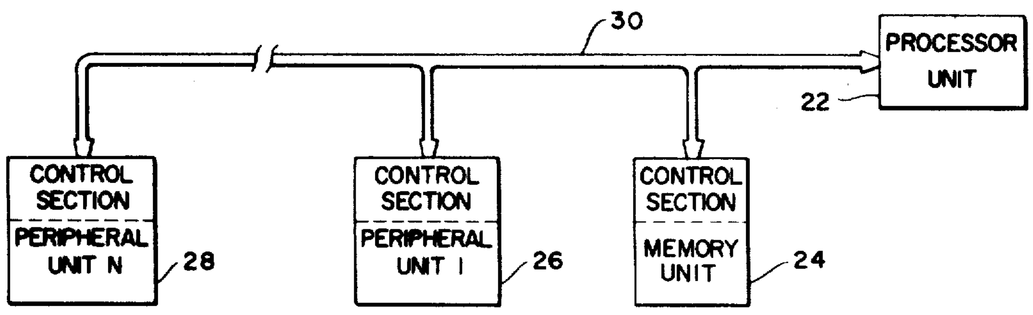

FIG. I

| OPERAND ADDRESS | | | | | |
|---|---|---|---|---|---|
| 5 | 4 | 3 | 2 | I | Ø |
| ADDRESS MODE | | | REGISTER SELECTION | | |

| ADDRESS MODE | ADDRESS MODE BITS 5 | 4 | 3 | DEFINITION |
|---|---|---|---|---|
| Ø | Ø | Ø | Ø | REGISTER-DIRECT |
| I | Ø | Ø | I | REGISTER DEFERRED |
| 2 | Ø | I | Ø | AUTO-INC DIRECT |
| 3 | Ø | I | I | AUTO-INC DEFERRED |
| 4 | I | Ø | Ø | AUTO-DEC DIRECT |
| 5 | I | Ø | I | AUTO-DEC DEFERRED |
| 6 | I | I | Ø | INDEX DIRECT |
| 7 | I | I | I | INDEX DEFERRED |

| REGISTER SELECTION BITS 2 | I | Ø | SELECTED REGISTER |
|---|---|---|---|
| Ø | Ø | Ø | RØ |
| Ø | Ø | I | RI |
| Ø | I | Ø | R2 |
| Ø | I | I | R3 |
| I | Ø | Ø | R4 |
| I | Ø | I | R5 |
| I | I | Ø | R6 |
| I | I | I | R7 |

FIG. 4

INVENTORS
HAROLD L. McFARLAND, JR.
JAMES F. O'LOUGHLIN
BY BRUCE A. DELAGI

Cesari and McKenna
ATTORNEYS

INVENTORS
HAROLD L. McFARLAND, JR.
JAMES F. O'LOUGHLIN
BY BRUCE A. DELAGI

Cesari and McKenna
ATTORNEYS

PATENTED OCT 19 1971

3,614,740

SHEET 03 OF 15

INVENTORS
HAROLD L. McFARLAND, JR.
JAMES F. O'LOUGHLIN
BY BRUCE A. DELAGI

Cesari and McKenna
ATTORNEYS

PATENTED OCT 19 1971

3,614,740

SHEET 04 OF 15

INVENTORS
HAROLD L. McFARLAND, JR.
JAMES F. O'LOUGHLIN
BY BRUCE A. DELAGI

Cesari and McKenna
ATTORNEYS

INVENTORS
HAROLD L. McFARLAND, JR
JAMES F. O'LOUGHLIN
BRUCE A. DELAGI
BY

Cesari and McKenna
ATTORNEYS

INVENTORS
HAROLD L. McFARLAND, JR.
JAMES F. O'LOUGHLIN
BY BRUCE A. DELAGI

Cesari and McKenna
ATTORNEYS

INVENTORS
HAROLD L. McFARLAND, JR.
JAMES F. O'LOUGHLIN
BY BRUCE A. DELAGI

Cesari and McKenna
ATTORNEYS

INVENTORS
HAROLD L. McFARLAND, JR.
JAMES F. O'LOUGHLIN
BY BRUCE A. DELAGI

ATTORNEYS

INVENTORS
HAROLD L. McFARLAND, JR
JAMES F. O'LOUGHLIN
BRUCE A. DELAGI
BY
ATTORNEYS

INVENTORS
HAROLD L. McFARLAND, JR
JAMES F. O'LOUGHLIN
BRUCE A. DELAGI
BY
Cesari and McKenna
ATTORNEYS INVENTORS
HAROLD L. McFARLAND, JR
JAMES F. O'LOUGHLIN
BRUCE A. DELAGI
BY
ATTORNEYS INVENTORS
HAROLD L. McFARLAND, JR.
JAMES F. O LOUGHLIN
BY BRUCE A. DELAGI

ATTORNEYS

INVENTORS
HAROLD L. McFARLAND, JR.
JAMES F. O'LOUGHLIN
BRUCE A. DELAGI
BY
Cesari and McKenna
ATTORNEYS

| MEMORY LOCATION | CONTENT | MEANING |
|---|---|---|
| | OPERATING PROGRAM | |
| 1 | INST. 1 | |
| 2 | INST. 2 | |
| 3 | JSR R5,RØ(1) | GO TO "COSINE" SUBROUTINE |
| 4 | INST. 4 | |
| 5 | JSR R5, R7(3) | GO TO "PRINT" SUBROUTINE |
| 6 | 12Ø | ADDRESS FOR SUBROUTINE |
| 7 | 1ØØØ | ADDRESS FOR DATA |
| 1Ø | HALT | STOP PROGRAM |
| | COSINE SUBROUTINE | |
| 11Ø | COS-1 | |
| 111 | COS-2 | |
| 112 | COS-3 | |
| ⋮ | | |
| 117 | RTS R5 | STOP SUBROUTINE |
| | PRINT SUBROUTINE | |
| 12Ø | MOV R5(3),R2(1) | MOVE DATA TO PRINTER |
| 121 | RTS R5 | STOP SUBROUTINE |
| | INTERRUPTION ROUTINE | |
| 2ØØ | INT-1 | |
| ⋮ | | |
| 2Ø5 | JSR R5, RØ(1) | GO TO "COSINE" SUBROUTINE |
| 2Ø6 | RTI | STOP INTERRUPTION ROUTINE |
| | MISCELLANEOUS | |
| 477 | 11Ø | "COSINE" SUBROUTINE ADDRESS |
| 5ØØ | 2ØØ | INTERRUPTION ROUTINE ADDRESS |
| 5Ø1 | 1ØØ | STATUS WORD |
| ⋮ | | |
| 1ØØØ | X | DATA |
| ⋮ | | |
| 2ØØØ | 4 | OPERATING PROGRAM ADDRESS |
| 2ØØ1 | 112 | ADDRESS IN "COSINE" SUBROUTINE |
| 2ØØ2 | Ø | OPERATING PROGRAM STATUS WORD |
| 2ØØ3 | (R5) | ORIGINAL R5 REGISTER CONTENTS |
| ⋮ | | |

FIG. 13

INVENTORS
HAROLD L. McFARLAND, JR.
JAMES F. O'LOUGHLIN
BRUCE A. DELAGI
BY
Cesari and McKenna
ATTORNEYS

DATA PROCESSING SYSTEM WITH CIRCUITS FOR TRANSFERRING BETWEEN OPERATING ROUTINES, INTERRUPTION ROUTINES AND SUBROUTINES

BACKGROUND OF THE INVENTION

1. Field of the Invention

This invention generally relates to data processing systems and more specifically to processor units for data processing systems which are capable of interchanging operating routines.

2. Discussion of the Prior Art

A data processing system usually includes a processor unit which executes instructions that are stored at addresses or locations in a memory. These instructions are transferred to the processor unit sequentially under the control of a program counter. The data that the computer processes is transferred into and out of the computer by way of input/output devices, or peripheral units, such as teletypewriters, tape punches or card readers. Usually, the data is temporarily stored in the memory before and after processing.

During normal operations, instructions are retrieved from memory locations designated by the program counter. Each instruction normally includes an operation code and an operand address. The operation code defines the operation to be performed by the processor unit, while the operand address defines the memory location of the data to be transferred or the memory location to which the data is to be transferred.

Instructions are usually organized in blocks of contiguous memory locations as "operating programs," "subroutines" or "interruption routines," each of these being a category of "operating routine." For purposes of this discussion, an "operating program" comprises instructions used to solve a specific problem. Instructions for producing an actuarial table would constitute an actuarial operating program, for example.

A "subroutine" comprises instructions used to perform a general function which may be required several times in an operating program or in different operating programs. For example, many data processing systems generate trigonometric functions using mathematical approximations. An operating program requiring the value of a trigonometric function, such as cos $\theta$, utilizes a cosine subroutine stored in the memory to obtain the value of cos $\theta$ for a specific value of $\theta$ supplied by the operating program. A print subroutine similarly comprises those instructions which the processor unit must execute to transfer data to a peripheral.

"Interruption routines" comprise instructions used whenever "interrupting" conditions exist. Interrupting conditions may be internal with respect to the processor unit and caused by power failures or illegal instructions. They may also be external to the processor unit as when an input/output device needs to communicate with the processor unit or the memory.

In a first type of data processing system, an operating program instruction to transfer the processor unit to a subroutine contains an operand address identifying the first address of the subroutine and a subroutine designation as an operation code. In response to the instruction, the processor unit moves the program counter contents, which define the next-operating program instruction location, to the first address of the subroutine. Then the instruction operand address is incremented and transferred to the program counter. Now the program counter contains the address for the first subroutine instruction in the memory unit. The processor unit executes the subroutine instructions in sequence.

In these systems, the last subroutine instruction contains the address of the first address in the subroutine. This address contains the operating program address for the next-operating program instruction, and the contents are transferred to the program counter. This enables the processor unit to obtain the next-operating program instruction.

It is often advantageous to transfer processor unit operation from a first subroutine to a second subroutine which utilizes the first subroutine. In other situations, it may be advantageous if the first subroutine recalls itself. These transfers are difficult, and sometimes impossible, to achieve with data processing systems of the above type without modification or without increasing the number of instructions. When the first subroutine is called for a first time, the operating program count is transferred to the first subroutine location (e.g., SR-1). When the first subroutine is recalled by an intermediate routine, for example, the existing contents of the program counter are transferred to the same memory location SR-1. The operating program count is destroyed. As a result, the processor unit can return to the intermediate routine and from the intermediate routine to the first subroutine. However, processor operation cannot be returned to the operating program.

In a second type of data processing system which permits a first or second subroutine to recall the first subroutine, the processor unit moves the program counter contents to a specified storage location rather than the location defined by the operand address. The last subroutine instruction includes the address for the operating program count. Although these systems permit one subroutine to utilize another subroutine, (i.e. to "nest" subroutines) and permit a partially completed subroutine to be used subsequently for other purposes, one reserved memory location is required for each nesting level. Increasing the number of these memory locations for each nested subroutine increases the complexity of control circuitry or programming. Programming complexity is increased because the last subroutine instruction must be modified to address the proper memory location for each subroutine when it is used. Therefore, this approach becomes more cumbersome as the number of nesting levels are increased.

In data processing systems of a third type, the program counter contents for the operating program are moved to a block of sequential memory locations. The last subroutine instruction moves the operating program count from the block to the program counter. Although this approach permits multiple nesting levels, it does not readily permit data in the operating program following the subroutine instruction to be transferred to the subroutine because the program counter contents are immediately modified to identify the subroutine instruction locations. Therefore, programming complexity is increased in order to transfer the data, which may comprise values or data addresses for the subroutine.

Therefore, it is an object of this invention to provide a data processing system in which subroutine transfers are simplified.

Another object of this invention is to provide a data processing system which enables a first or second subroutine to recall the first subroutine.

Still another object of this invention is to provide a data processing system which enables any number of subroutines to be used before previous subroutines are completed.

Still another object of this invention is to provide a data processing system in which data in the operating program can be transferred to the subroutine.

Interrupting conditions are recognized in accordance with a prearranged priority. When a condition is recognized, the processor unit executes the appropriate interruption routine. In some data processing systems, the interrupting device produces an unique "interrupting vector." This vector, a memory address, defines the first of two contiguous memory locations. The first memory location stores the first instruction address for the interruption routine; the second, a status-word-identifying processor unit priority when the interruption routine is being executed.

After the program counter contents and status word for the operating program are stored at predetermined memory locations, the new address and status word are transferred to the processor unit. If a second interrupting condition with a higher priority occurs, the first interruption routine must be interrupted. In some systems, the first interruption routine cannot be interrupted; in others it is merely abandoned to be rerun in its entirety later.

In other systems, registers or memory locations are used to store the program count and status word for each priority level. In the previous example, the first interruption routine is completed after the second interruption routine is terminated. Even with these limitations, inefficient memory utilization is encountered. Programming also becomes complex because each instruction in the last position of the interruption routine must be modified to identify the memory location with the operating program information.

In still other data processing systems, the contents of the program counter and a given memory location are exchanged. The given memory location contains the first interruption routine instruction address before the exchange. As a result, the address is transferred to the program counter while the operating routine program count is transferred to the given memory location. Programming becomes cumbersome with this approach if multiple interruption conditions are handled by the processor unit and a system malfunction occurs.

Therefore, it is another object of this invention to provide a data processing system with simplified interruption routine programming.

Yet another object of this invention is to provide a data processing system with a processor unit cable of servicing multiple interruption requests of increasing priority.

Finally, it is also necessary from time to time to interrupt subroutines and then call the interrupted subroutine as a part of the interruption routine. Some computers do not permit the interruption routine to use any subroutine which has not been completed even though they permit nested subroutines and multiple interruptions. For example, a subroutine for calculating a cosine could be interrupted with the resulting interruption routine requiring the same cosine subroutine. In these situations, complex programming and inefficient memory use are encountered to use the subroutine.

Therefore, it is another object of this invention to provide a data processing system with a processor unit capable of executing instructions from and transferring between any operating routines stored in the memory unit.

Still another object of this invention is to provide a data processing system with a processor unit capable of executing instructions from and transferring among operating programs, subroutines and interruption routines without restriction.

SUMMARY

Briefly stated, a subroutine transfer instruction or an interruption vector identifies the location of the subroutine or interruption routine in a memory unit. The subroutine transfer instruction also identifies a register. Process unit operation is transferred to the subroutine by storing the existing program counter contents in the register and the register contents in a vacant memory location contiguous to other stored information. The last subroutine instruction moves the register contents to the program counter and the last contiguously stored information in the memory to the register.

When it is necessary to transfer to an interruption routine, the operating routine program count and status word are stored in the next two vacant contiguous memory locations. Then the status word and first instruction address are transferred to the processor unit. The last interruption routine instruction moves the last two contiguously stored information items to the processor unit. When these transfers are completed, the processor unit continues executing instructions in the interrupted operating routine.

This invention is pointed out with particularity in the appended claims.

The above and further objects and advantages of this invention may be attained by referring to the following description taken in conjunction with the drawings.

BRIEF DESCRIPTIONS OF THE DRAWINGS

FIG. 1 illustrates a data processing system adapted to implement this invention;

FIG. 4 illustrates the organization of an instruction operand address;

Figure 2:
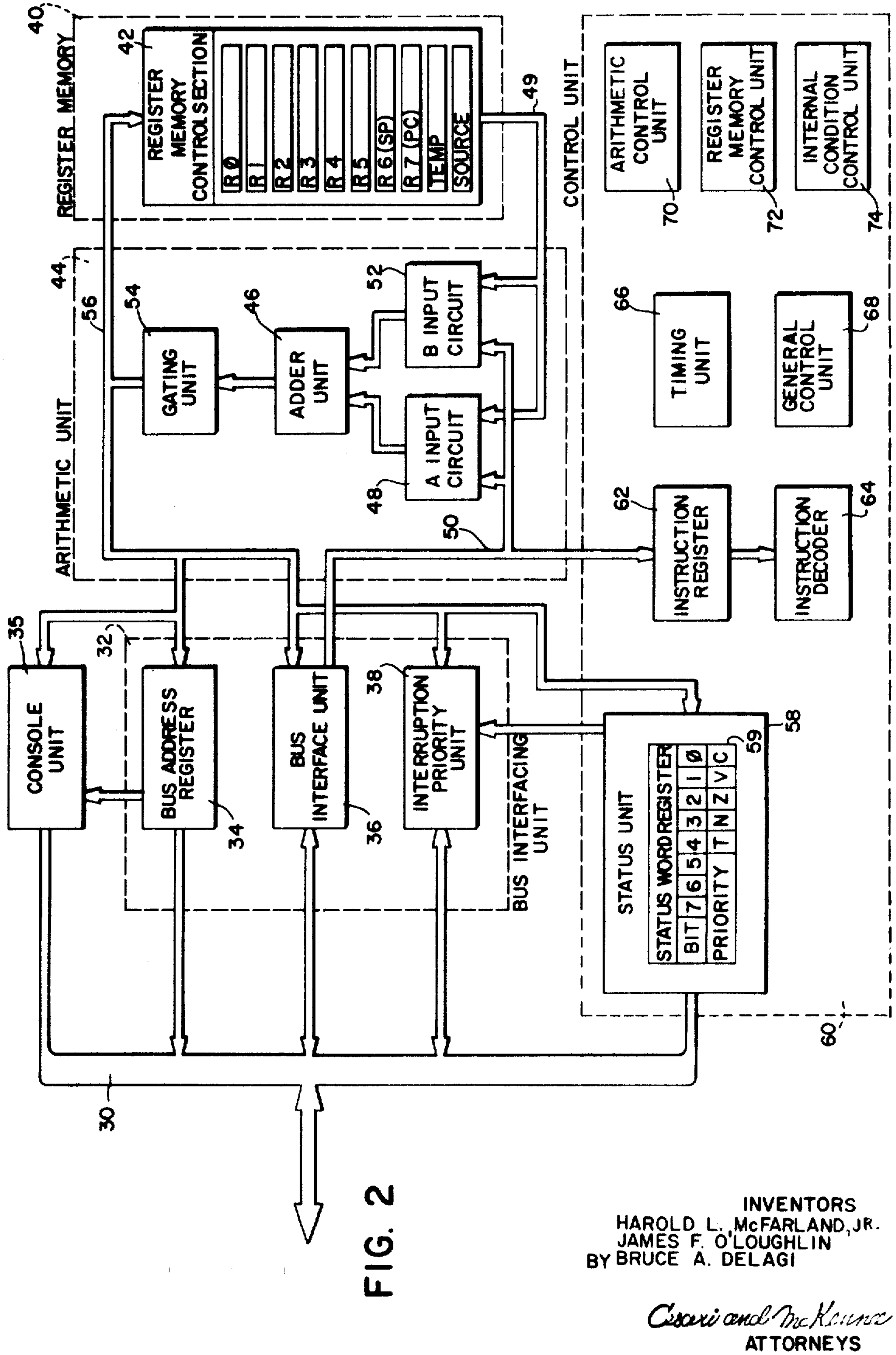
FIG. 2 is a schematic of an embodiment of the processor unit shown in FIG. 1.
Figure 5:
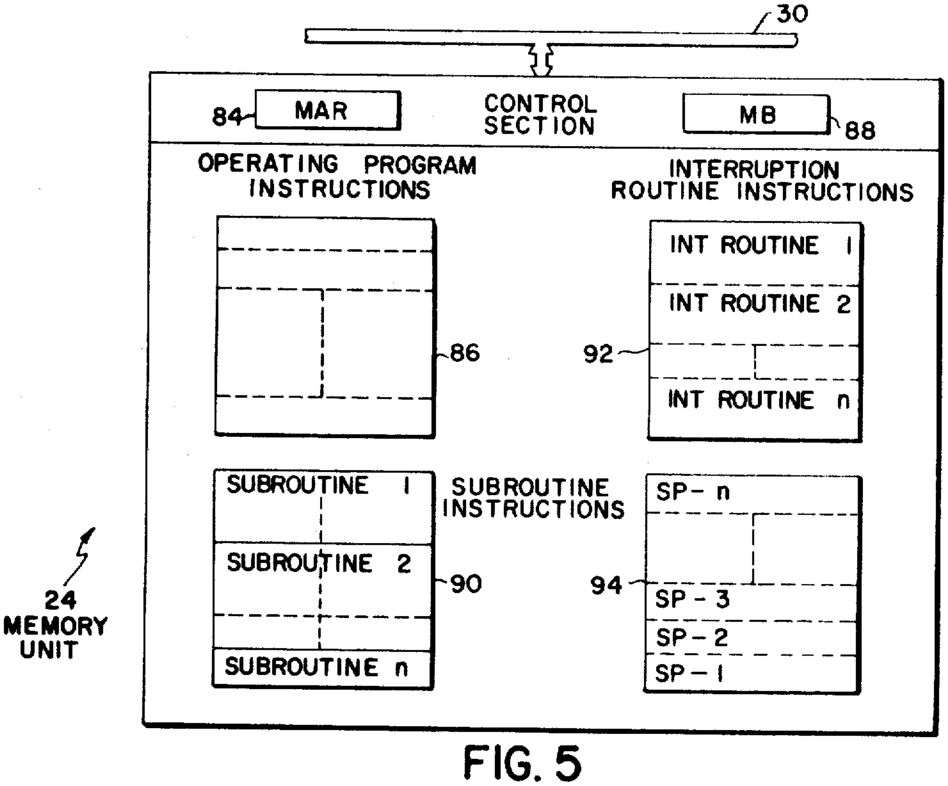
FIG. 5 illustrates an embodiment of the memory unit shown in FIG. 1.
Figure 7A:
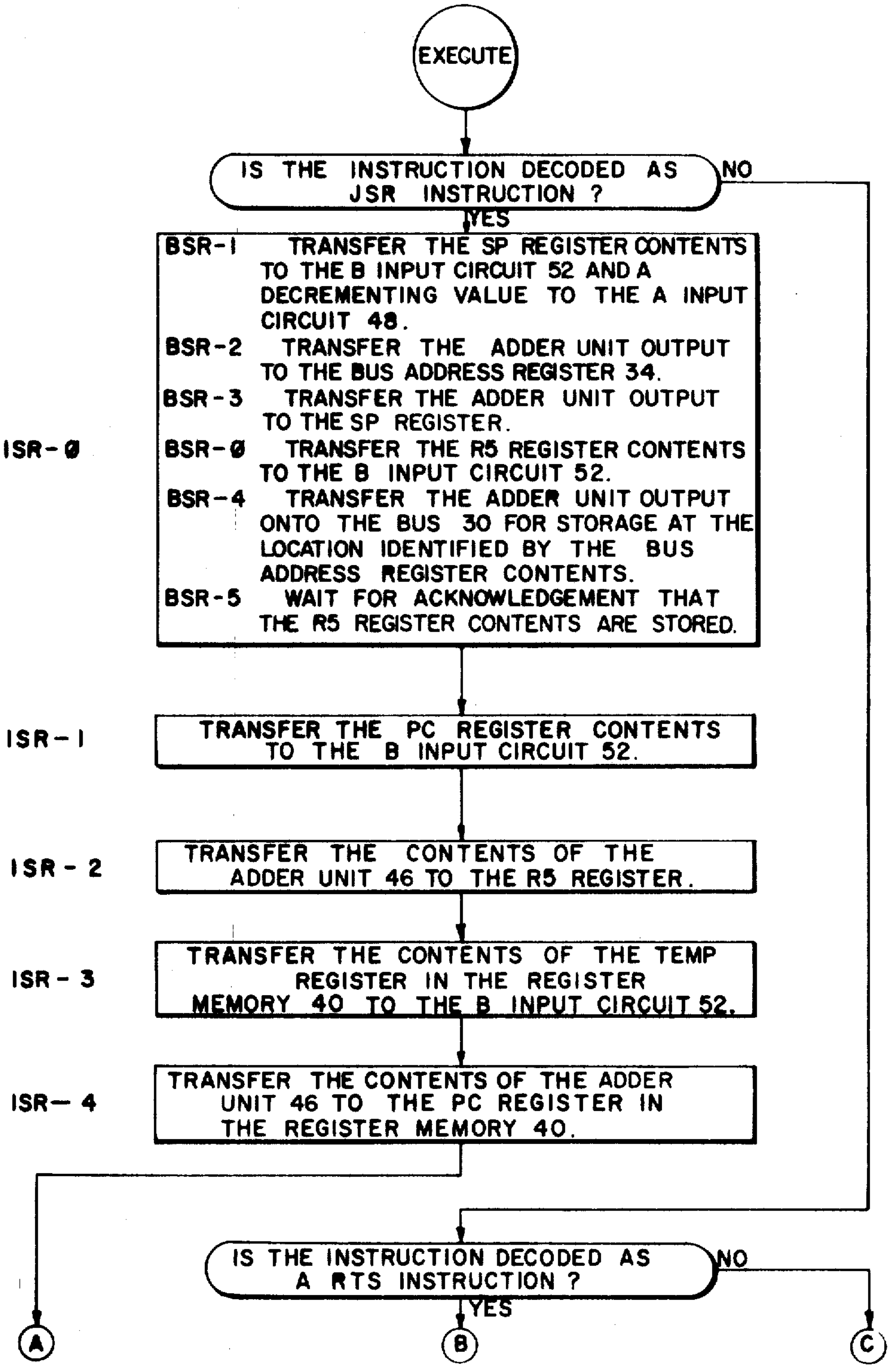
Figure 7B:
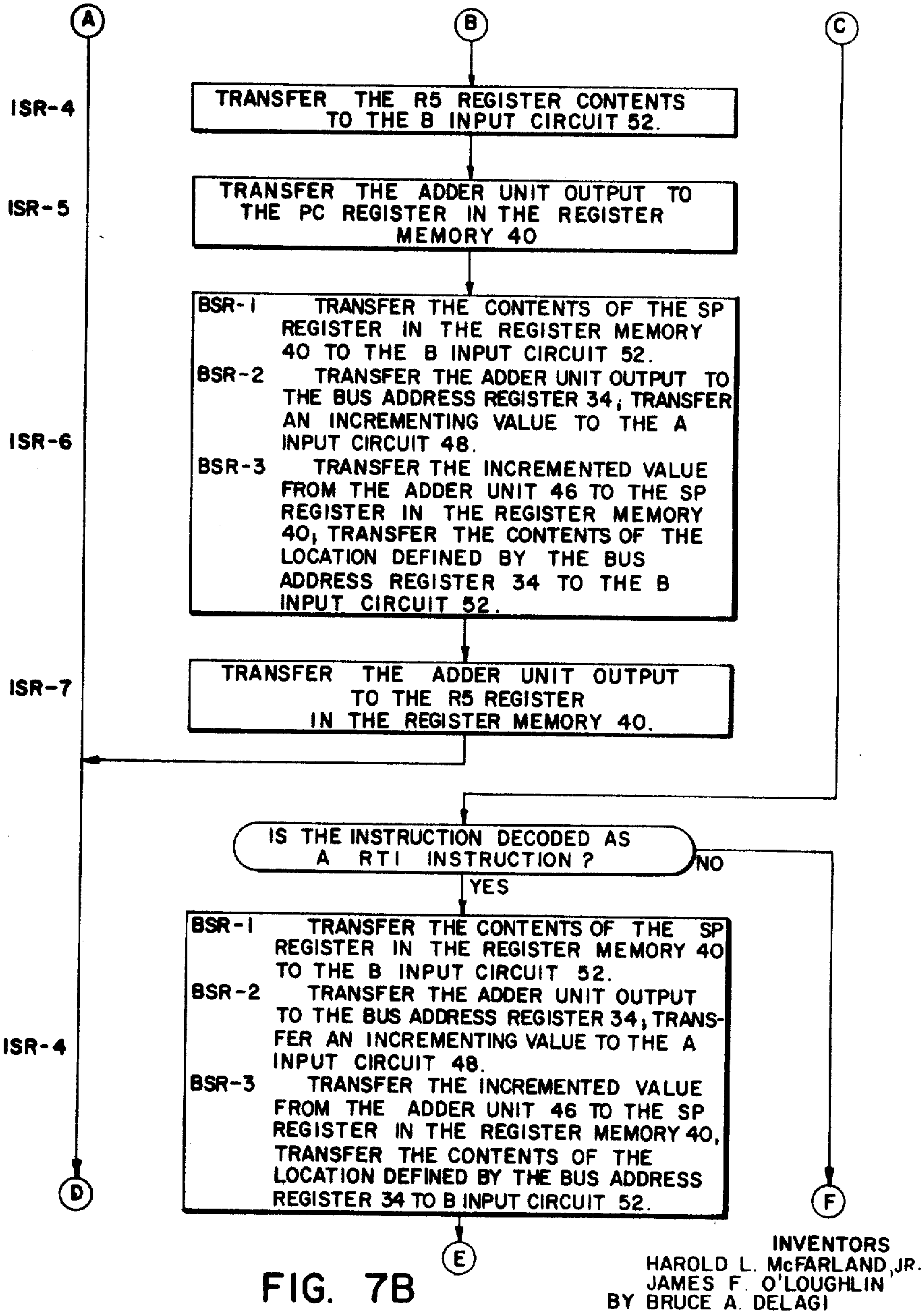
Figure 7C:
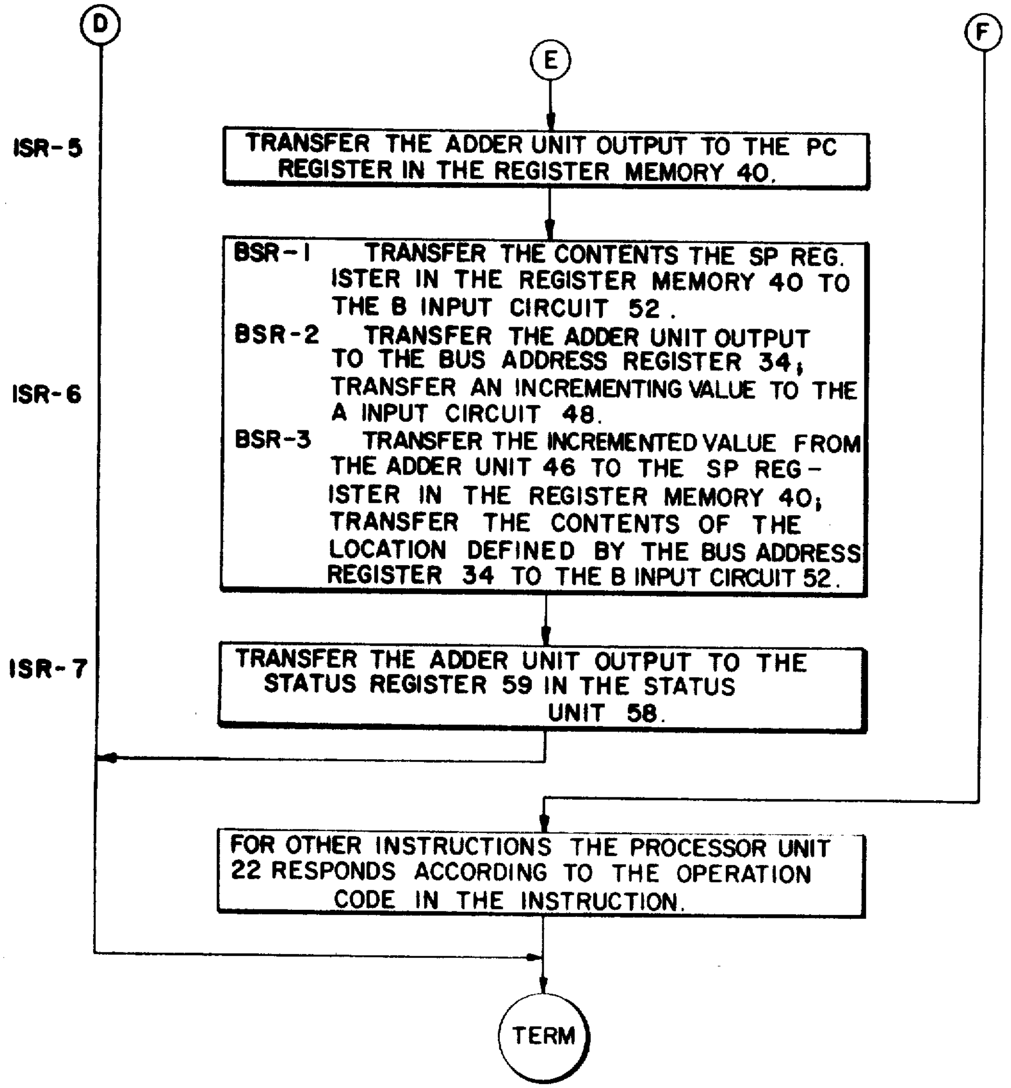
Figure 8A:
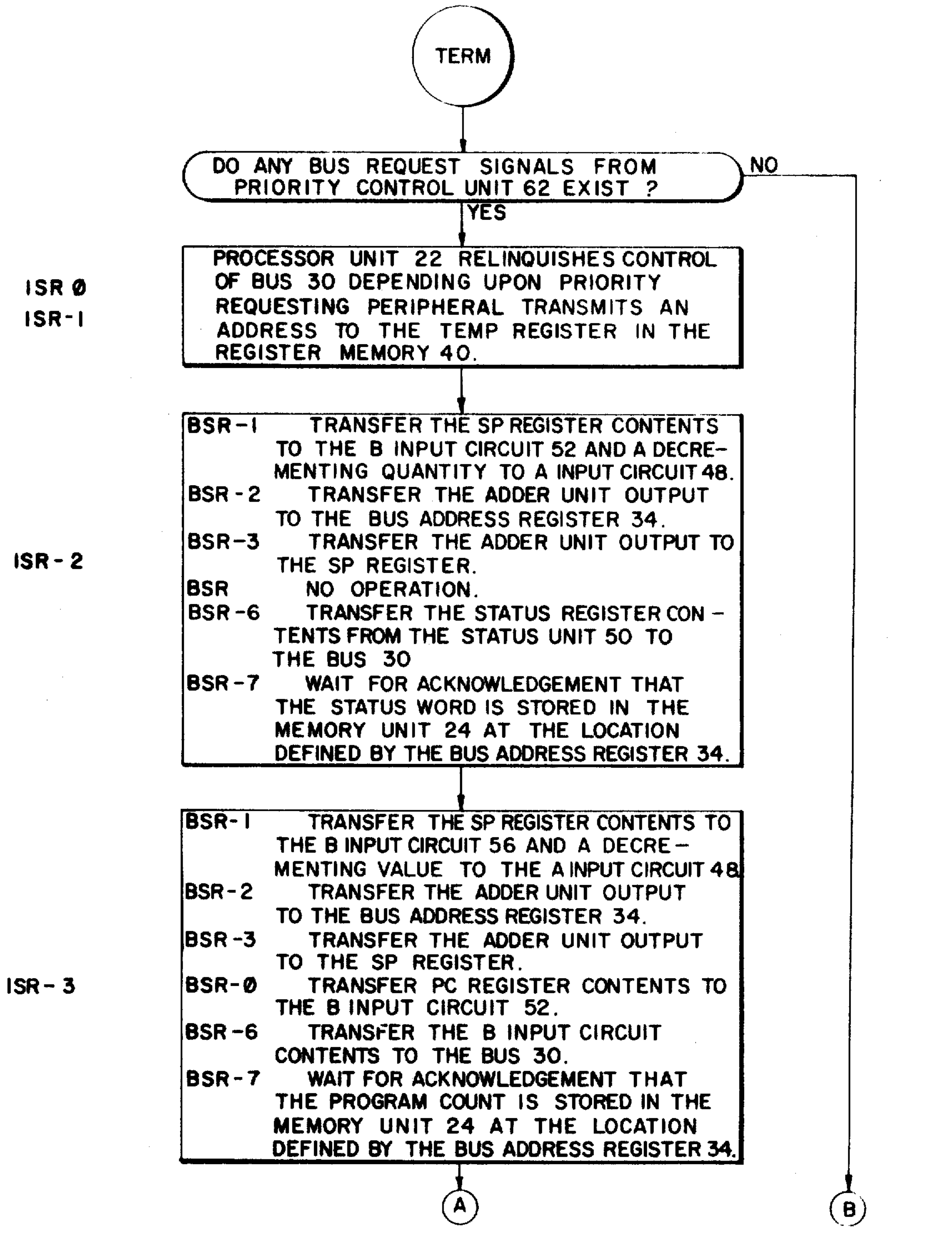
Figure 8B:
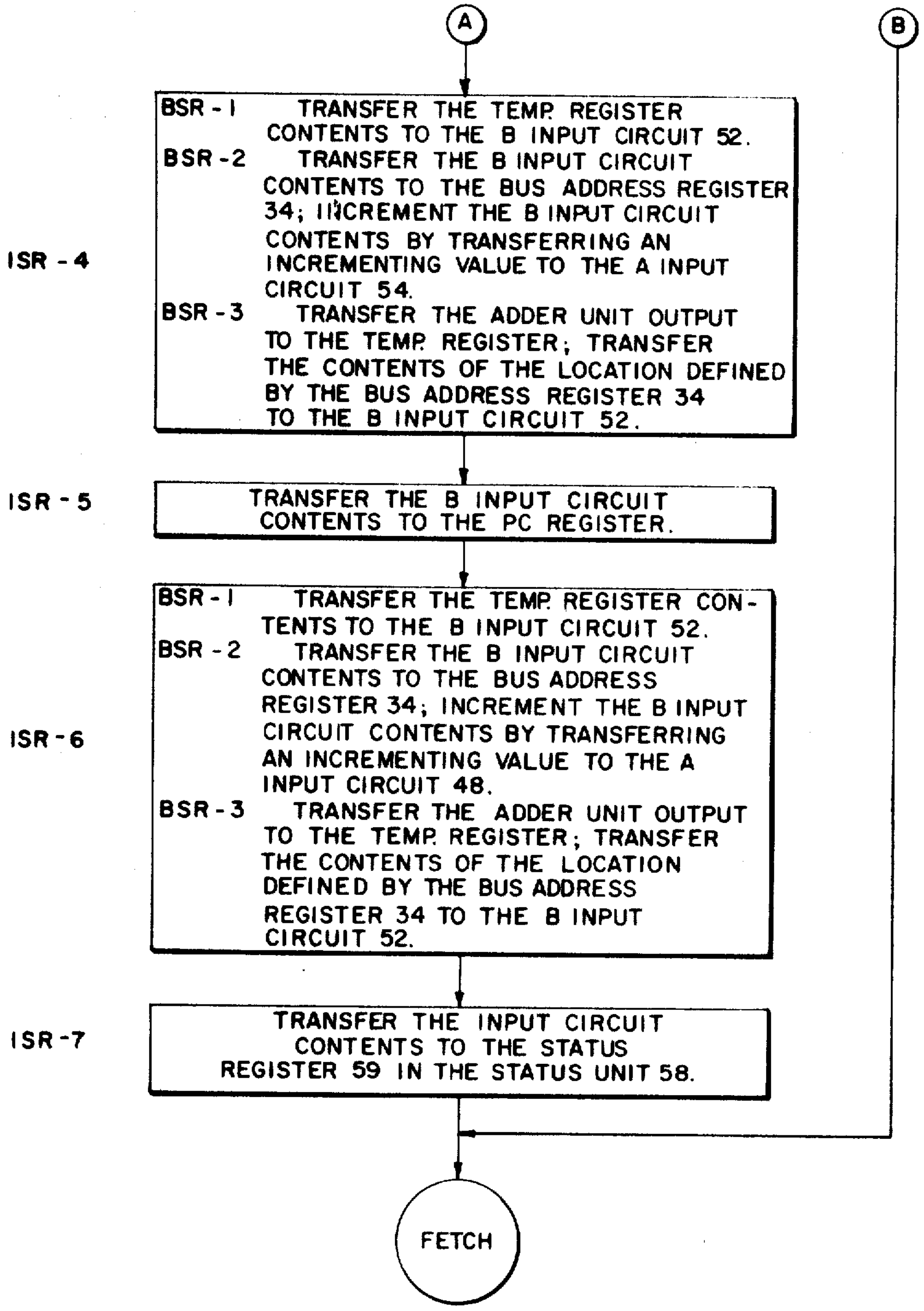
Figure 9A:
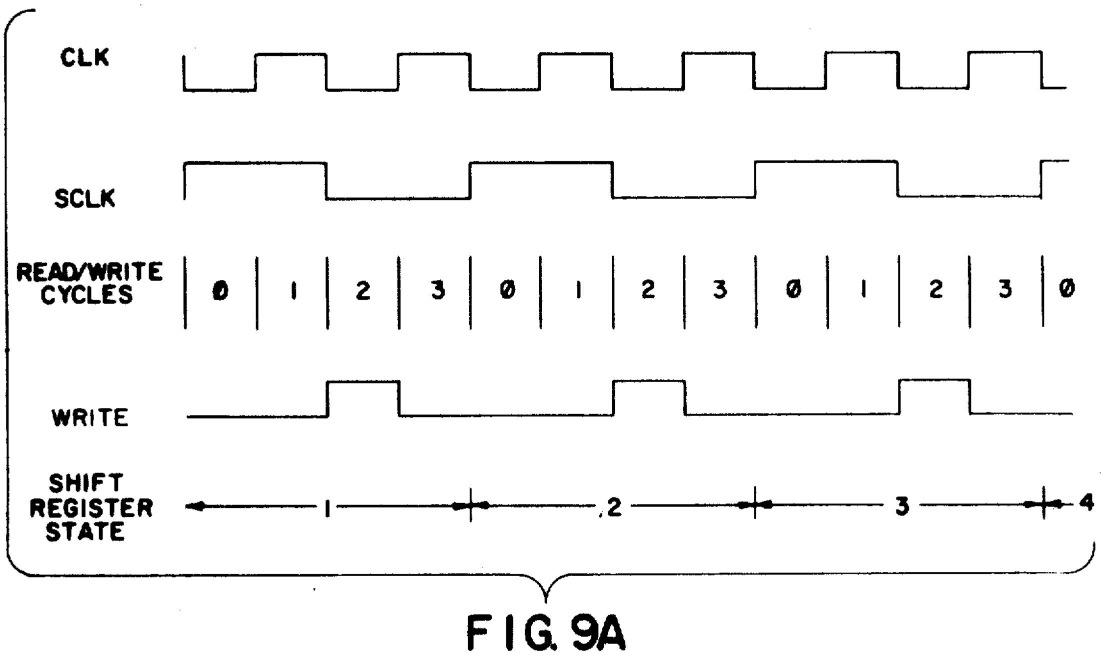
Figure 9B:
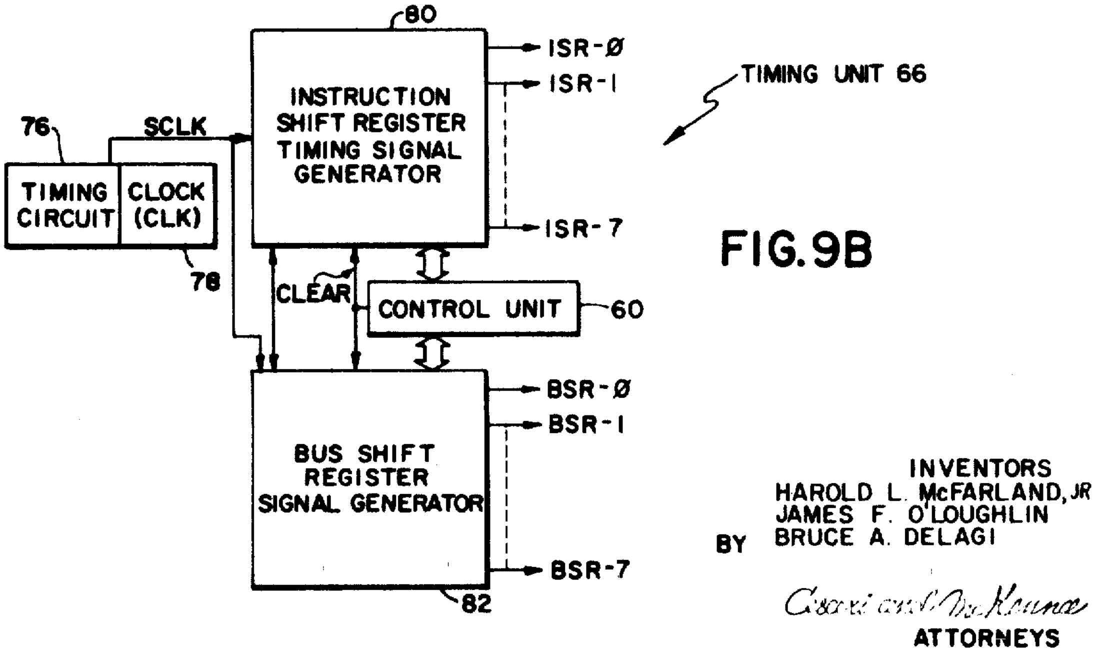
Figure 10:
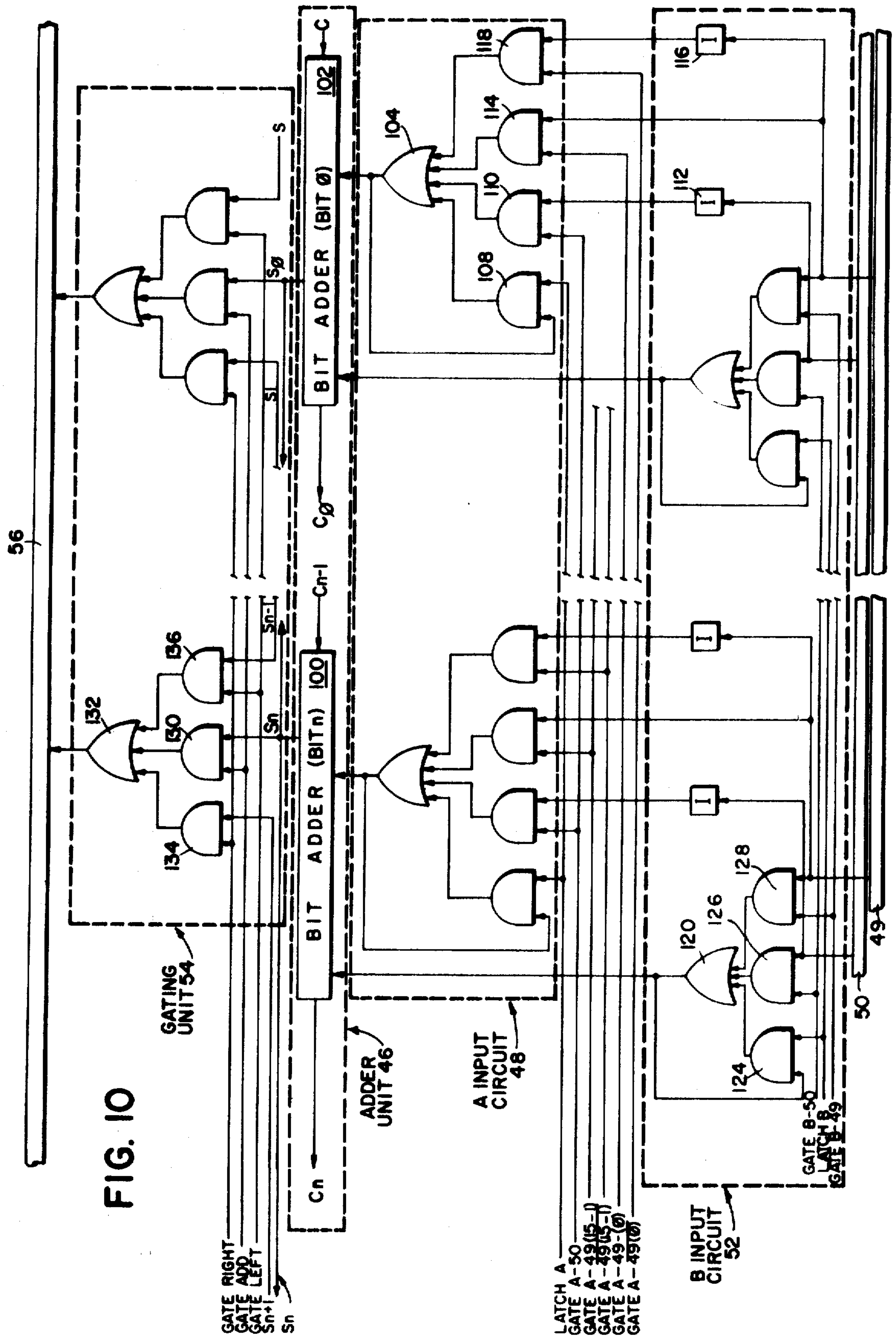
Figure 11:
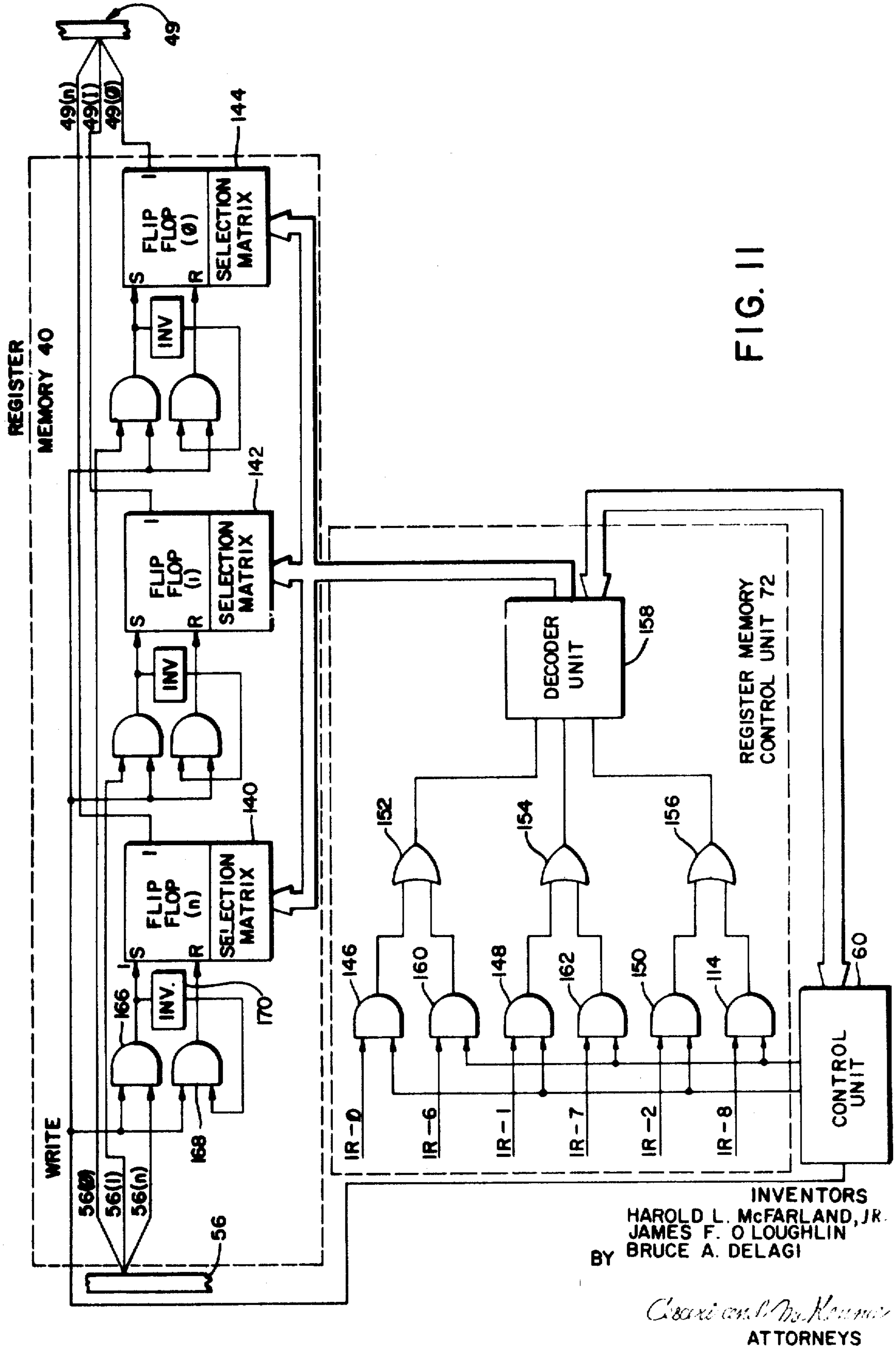
Figure 12:
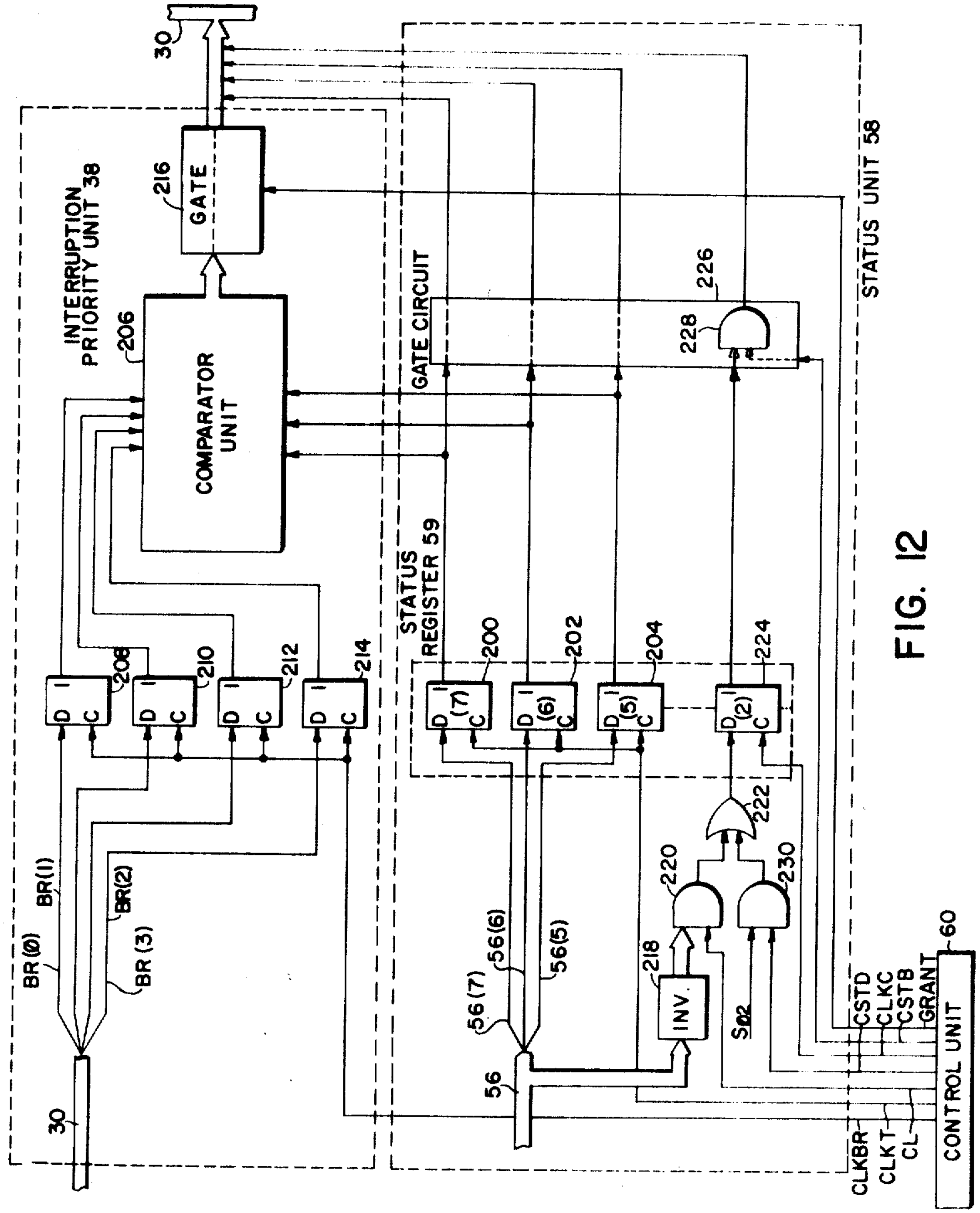

FIGS. 7A, 7B, and 7C are a flow diagram of an "execute" cycle executed by the processor unit of FIG. 2;

FIGS. 8A and 8B are a flow diagram of a "term" cycle executed by the processor unit of FIG. 2;

FIGS. 9A and 9B depict a timing unit for the processor unit of FIG. 2;

FIG. 10 is a schematic of an arithmetic unit for the processor unit shown in FIG. 2;

FIG. 11 is a schematic of a register memory control unit and register memory for the processor unit shown in FIG. 2;

FIG. 12 is a schematic of a status and interruption priority unit for the processor unit shown in FIG. 2; and FIG. 13 illustrates how the memory unit of FIG. 5 could be organized for a specific situation.

DESCRIPTION OF AN ILLUSTRATIVE EMBODIMENT

1. General Description

The data processing system illustrated in FIG. 1 includes a processor unit 22, a random access memory unit 24 and a plurality of peripheral units, such as peripheral units 26 and 28. The various units are interconnected by a bidirectionally conducting bus 30 to permit direct data and instruction transfers between them. While the exemplary system of FIG. 1 provides all the advantages of the disclosed invention, this invention is adapted for implementation in other data processing system configurations with the realization of some, if not all, its advantages.

Each peripheral unit and memory unit includes a control section containing data buffer registers, address-decoding circuits for selection purposes, registers for storing interrupting vectors and other circuit elements necessary for unit control. Certain details of these control sections are described in more detail later. Additional advantages of the configuration shown in FIG. 1 can be more readily obtained by referring to the copending U.S. application Ser. No. 24,636 entitled "Data Processing System," filed Apr. 1, 1970, and assigned to the same assignee as the present invention.

The processor unit 22 is shown in FIG. 2. It is coupled to the bus 30 through a plurality of connections. The primary connection is through a bus interfacing unit 32 comprising a bus address register 34, a bus interface unit 36 and an interruption priority unit 38. Information in the form of data or instructions is transmitted to or received from locations constituted by the peripheral units or memory unit. Each location is defined by an address in the bus address register 34; and the data or instruction is transferred over the bus 30.

The bus address register 34 also transfers data with a console unit 35 which is coupled to the bus 30. This enables the contents of the bus address register 34 to be transferred to the console unit 35 for display purposes or an address to be supplied by the console unit 35 to bus 30 for testing purposes.

A register memory 40 comprises a control section 42 and a plurality of storage registers identified as RO through R7, TEMP and SOURCE. The R7 register is the program counter and is identified as either the R7 or PC register depending upon its function. The R6 register is designated as an SP register when it functions to identify contiguous memory unit locations. Details of the register memory 40 are described with reference to FIG. 11.

Still referring to FIG. 2, an arithmetic unit 44 includes an adder unit 46 and two input circuits. The A and B input circuits 48 and 52 each receive inputs from the register memory 40 on a bus 49 and from the bus interface unit 36 in a bus 50. Output signals from the adder unit 46 are transmitted through a gating unit 54 with rotate and shift capabilities onto a bus 56. The bus 56 is coupled to bus address register 34, bus interface unit 36, the interruption priority unit 38, the register memory 40 and a status unit 58. The status unit 58 includes a status word register 59 and is located in a control unit 60.

The eight-bit status register 59 is shown in FIG. 2 and stores the least significant eight bits on the bus 30 when they define the processor priority, previous operations and whether the processor unit 22 can be stopped or "trapped" after an instruction. Specifically, the priority bits (bits 5, 6 and 7) define one of eight priorities. A T bit (bit 4) is set to provide trapping. A N bit (bit 3) may be set if the result of the previous instruction was negative, while a Z bit (bit 2) may be set for zero results. A V (bit 1) may be set when an arithmetic overflow occurs while a C bit (bit 0) may be set when a carry is generated by the adder unit 46 for the most significant bit.

Information transfers within the processor unit 22 are supervised by the control unit 60. Generally, instructions are coupled from the bus 50 to an instruction register 62 for decoding in an instruction decoder 64 in response to signals from a timing unit 66 and a general control unit 68. The timing signals and signals from the instruction decoder 64 and the general control unit 68 are also coupled to an arithmetic control unit 70 which controls the various units in the arithmetic unit 44.

Operations in the register memory 40 are controlled by a register memory by said unit 72. Internal computer operating conditions are monitored by an internal control unit 74 which also responds to other signals in the control unit 60. Signals indicating the existence of certain internal conditions can be coupled through the B input circuit 52, adder unit 46 and gating unit 54 onto the bus 56.

Before describing the details necessary to a complete understanding of this invention, it will be helpful to review how the processor unit 22 transfers information in response to various instructions. During a "fetch" cycle, described in detail with reference to FIG. 6, the control unit 60, including the arithmetic control unit 70 and the register memory control unit 72, transfers the program count from the PC register (the R7 register in the register memory 40) through the B input circuit 52, the adder unit 46, and gating unit 54 to the bus address register 34 without modification. The program count is then incremented and returned to the PC register. Then the instruction in the location addressed by the bus address register 34 is obtained and coupled through the bus interface unit 36 into an instruction register 62. After the instruction is decoded in an instruction decoder 64 as described with reference to FIG. 3, the control unit 60 completes the "fetch" cycle.

Figure 3:
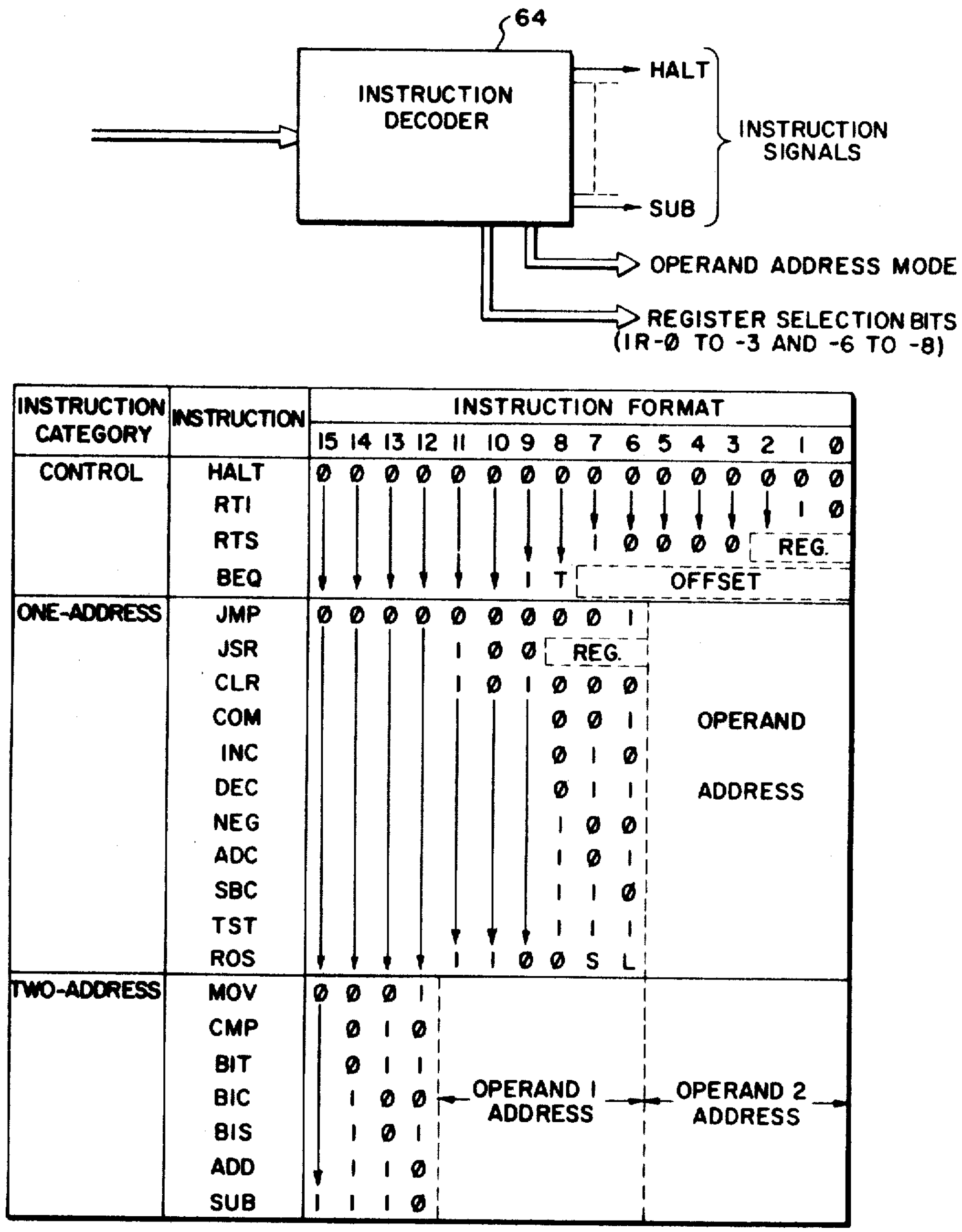
FIG. 3 depicts an embodiment of the instruction decoder in the processor unit shown in FIG. 2.

If the instruction is one of several control instructions shown in FIG. 3, the control unit 60 may cause the processor unit 22 to divert to either an "execute" or a "term" cycle. If the instruction contains an operand address, such as an operand address shown in FIG. 4, it is decoded and the operand, usually data, defined by the operand address, is transferred from the memory unit to the processor unit.

After the data responsive been transferred to the processor unit 22, either a "term" or "execute" cycle completes processor unit operation. The "execute" cycle operates on the data retrieved during the "fetch" cycle in accordance with the operation code. During the "term" cycle, the processor unit 22 determines whether any conditions exist which require diversion to an interruption routine.

In accordance with this invention, the processor unit 22 can obtain instructions in sequence from one operating routine and then from another operating routine. These operating routines are usually stored in different groups of memory locations, a typical organization for the memory unit 24 being shown in FIG. 5. Addresses from the bus address register 34 are coupled to a memory address register (MAR) 84. If instructions or data are being transferred to the memory unit, then they are transferred through the memory buffer (MB) 88 to the designated locations. Instructions or data in memory locations are transferred from the designated memory locations through the memory buffer 88 onto the bus 30.

The memory unit 24 is divided into blocks, or groups of contiguous memory locations, for storing related instructions in sequential order, and random locations. For example, the memory locations which comprise block 86 store operating program instructions. These locations are normally addressed by the PC register. A JSR instruction contains an address for block 90 which stores the various subroutine instructions. Interruption routine instructions are stored in a block 92 of contiguous memory locations. Block 94 stores the PC register contents and status register contents saved when a subroutine or interruption routine is initiated at locations defined by the SP (or R6) register contents.

Referring now to FIGS. 2 and 5, an instruction for an operating program is transferred from a location in the block 86 when the PC register contents are transferred through the arithmetic unit 44 to the bus address register 34. The addressed instruction is then obtained from the memory unit 24 and transferred to the instruction register 62 and the instruction decoder 64. If the instruction contains an operand address, the contents of the designated register are transferred through the B input circuit 52 and the arithmetic unit 44 onto the bus 56. If the arithmetic unit output on the bus 56 is data, the data is transferred to an address defined by the instruction and stored in the bus address register.

If the arithmetic unit output is an address, it is transferred to the bus address register 34. The contents of the addressed location are transferred to the A or B input circuit 48 or 52 as data or as another address. Understanding the details of addressing in accordance with the operand address format shown in FIG. 4 is not necessary to understand this invention. Additional details are provided in a copending U.S. Pat. application Ser. No. 21,973 entitled "Data Processing with Instruction Addresses Identifying One of a Plurality of Registers Including the Program Counter," filed concurrently herewith and assigned to the same assignee as the present invention.

In accordance with this invention, a JSR instruction usually has an octal format of the 004RXX where "R" usually identifies the R5 register and "XX" is the operand address. When this instruction is decoded, the R5 register contents are moved to the next vacant location in the block 90 defined by the SP register; and the PC register contents are moved to the R5 register. Then the contents of the memory location addressed by the operand address are transferred to the PC register. When the "execute" and "term" cycles required for decoding the JSR instruction are completed, the processor unit 22 produces a "fetch" cycle and obtains the first subroutine instruction from the memory unit.

With a RTS instruction, having the format 00020R, "R" usually identifies the R5 register. If another register is designated in the related JSR instruction, the RTS instruction must be modified. When the RTS instruction is decoded, the R5 register contents are moved to the PC register. In addition, the contents of the location identified by the SP register are moved to the R5 register. Hence, after the RTS instruction has been executed, the PC register contains the address of the operating program instruction following the JSR instruction.

The processor unit 24 can respond to any conditions requiring processor unit response during the "term" cycle. If such a request with sufficient priority is made, an interruption vector is moved to the processor unit 22 to identify two contiguous memory locations. These locations contain the first interruption routine instruction address and a related status word. The PC register contents and status register contents are transferred to the next two vacant locations in the block 94 under the control of the SP register. Then the first instruction address and related status word are transferred to the PC register and status word register 59 respectively. When the processor unit 22 executes the next "fetch" cycle, the first interruption routine instruction is obtained from the memory unit 24.

The final interruption routine instruction, an RTI instruction, returns the processor unit 22 to the interrupted operating routine. When the RTI instruction is decoded, the status word and nextnoperating routine program count are transferred from the block 94 to the status word register 59 and the PC register respectively. When the processor unit 24 executes the next "fetch" cycle; the operating routine instruction following the instruction, which was in the processor unit when the interruption occurred, is obtained from the memory unit.

An interrupted operating routine can be an operating program, a subroutine or an interruption routine. Therefore, any subroutine or interruption routine can be interrupted in addition to operating programs. Transferring the PC register contents to the R5 register and the R5 register contents to the block 94, enables subroutines to be nested and recalled as operating routines within other subroutines, interruption routines or operating programs. If the information is transferred to the same block, such as block 94, then interruption routines and subroutines can be intermixed. The RTI and RTS instruction at the end of each interruption routine or subroutine causes the processor unit to transfer back through the various routines in the reverse order to that in which the routines were initiated.

For example, assume a subroutine SUBR–1, used in an operating program, is interrupted and that the interruption routine requires the SUBR–1 subroutine. The processor unit starts the operating program, transfers to the SUBR–1 routine and is interrupted. Then the SUBR–1 subroutine is recalled.

At this point, the PC register contains a SUBR–1 instruction address and all return information is stored in the R5 register or in the block 94. The R5 register contains an address for the interruption routine while the information in the block 94 is arranged so the next-operating program instruction address is read out first for transfer to the R5 register. This is followed by the address for the next instruction for the SUBR–1 subroutine which was interrupted and the status word for the operating program.

When the SUBR–1 subroutine is completed, its RTS instruction transfers the R5 register contents to the PC register and the last information stored in the block 94 to the R5 register. This permits the processor unit 22 to complete the interruption routine and finally execute the RTI instruction. Now the address for the SUBR–1 subroutine instruction, following the instruction which was being executed when the interruption occurred, is transferred directly to the PC register. The status word is then moved to the status register 59. Finally the RTS instruction at the end of this subroutine transfers the R5 register contents back to the PC register to enable the processor unit to complete the operating program.

It is apparent from the general discussion that the data processing system in FIG. 1, including the processor unit 22 of FIG. 2, simplifies programming while enabling the processor unit to execute and partially execute various operating routines. Any level, number or combination of subroutines and interruption routines can be partially executed, but moving the PC register, R5 register and status register contents to the block 94 reduces programming complexity. Processor unit operating times are reduced for two reasons. First, using the R5 and SP registers in the register memory for these transfers reduces execution and transfer times and, with the RTI and RTS instructions, permits arithmetic nesting without significant address decoding.

2. Detailed Description

As the operation, address mode and register selection codes are interrelated and constitute primary signals in the control unit 60, FIGS. 3 and 4 illustrate the format for some exemplary instructions. Those instructions which are important to this invention are described in detail along with the significance of the various operand address modes.

a. Instructions

Referring specifically to FIG. 3, the instructions are arbitrarily divided into control, one-operand and two-operand address categories for discussion purposes. Each instruction is formed as shown in the Instruction Formal column. When a specific instruction is transferred to the instruction decoder 64 (FIG. 2), one instruction signal conductor is energized. Processor response to each instruction is described more completely in the previously identified U.S. Pat. application, Ser. No. 21,973. Only those instructions directly related to this invention, the JSR, RTI and RTS instructions, are described in detail. Each instruction produces a signal on an output conductor, both of which are designated by the same mnemonic as appears in the following table and in the instruction column of FIG. 3.

TABLE I

| Instruction | Octal Number | Function |
|---|---|---|
| JSR | 0004RXX | When it is necessary to obtain an intermediate result from another set of instructions and then return to the original operating program, the JSR instruction is issued where "R" is a three-bit code usually identifying the R5 register. The initial subroutine instruction address is located by the operand address XX. The address for the instruction following the JSR instruction in the original program is saved in the selected (R5) register. |
| RTS | 00020R | This is the last instruction in a subroutine. "R" is the three-bit register selection code usually identifying the R5 register. The processor unit obtains the instruction following the JSR instruction from the memory unit during the next "fetch" cycle. |
| RTI | 000002 | This is the last instruction in an interruption routine stored in the memory unit. The processor unit obtains the next instruction in the interrupted program from the memory unit during the next "fetch" cycle. |

b. Operand Addresses

The operand address utilized in the JSR instruction can have the format shown in FIG. 4. The processor unit response to each address mode is detailed in the previously identified U.S. Pat. application, Ser. No. 21,973. Response to each operand address mode is merely presented for review purposes.

TABLE II

| Address Modes | Function |
|---|---|
| 0 and 1 | The selected register contains data if MODE-0 and a data address if MODE-1. |
| 2 and 3 | The selected register contains a data address if MODE-2 and the address of an intermediate location containing data if MODE-3. The register contents are incremented after they are used. |
| 4 and 5 | The selected register contents are initially decremented. The decremented contents constitute a data address if MODE-4 and the address of an intermediate location containing a data address if MODE-5. |
| 6 and 7 | The contents of the next instruction location are retrieved as the index value and added to the selected register contents. The sum is a data address if MODE-6 and the address of an intermediate location containing a data address if MODE-7. |

c. Processor Unit Operation

With this general understanding of the significance of the address modes and register selection bits, it is possible to discuss various operation cycles produced by the processor unit 22 in response to the JSR, RTS and RTI instruction in detail.

i. "Fetch" Cycle

Figure 6A:
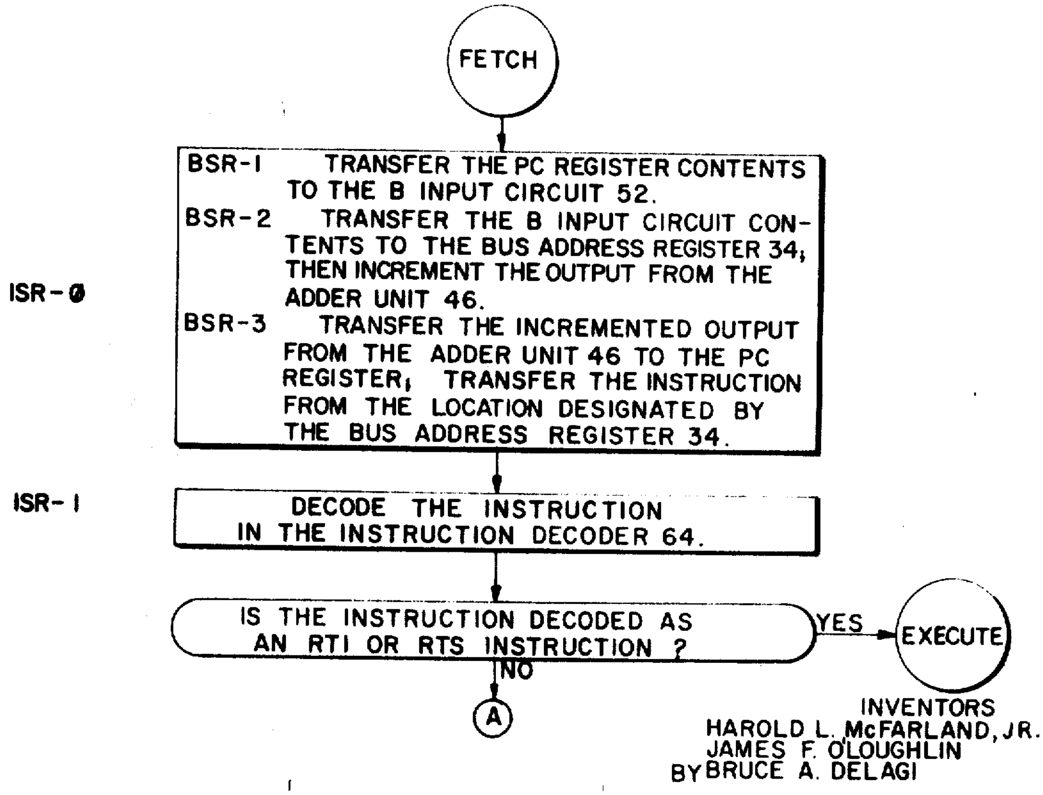
FIGS. 6A and 6B are a flow diagram of "fetch" cycle executed by the processor unit of FIG. 2.
Figure 6B:
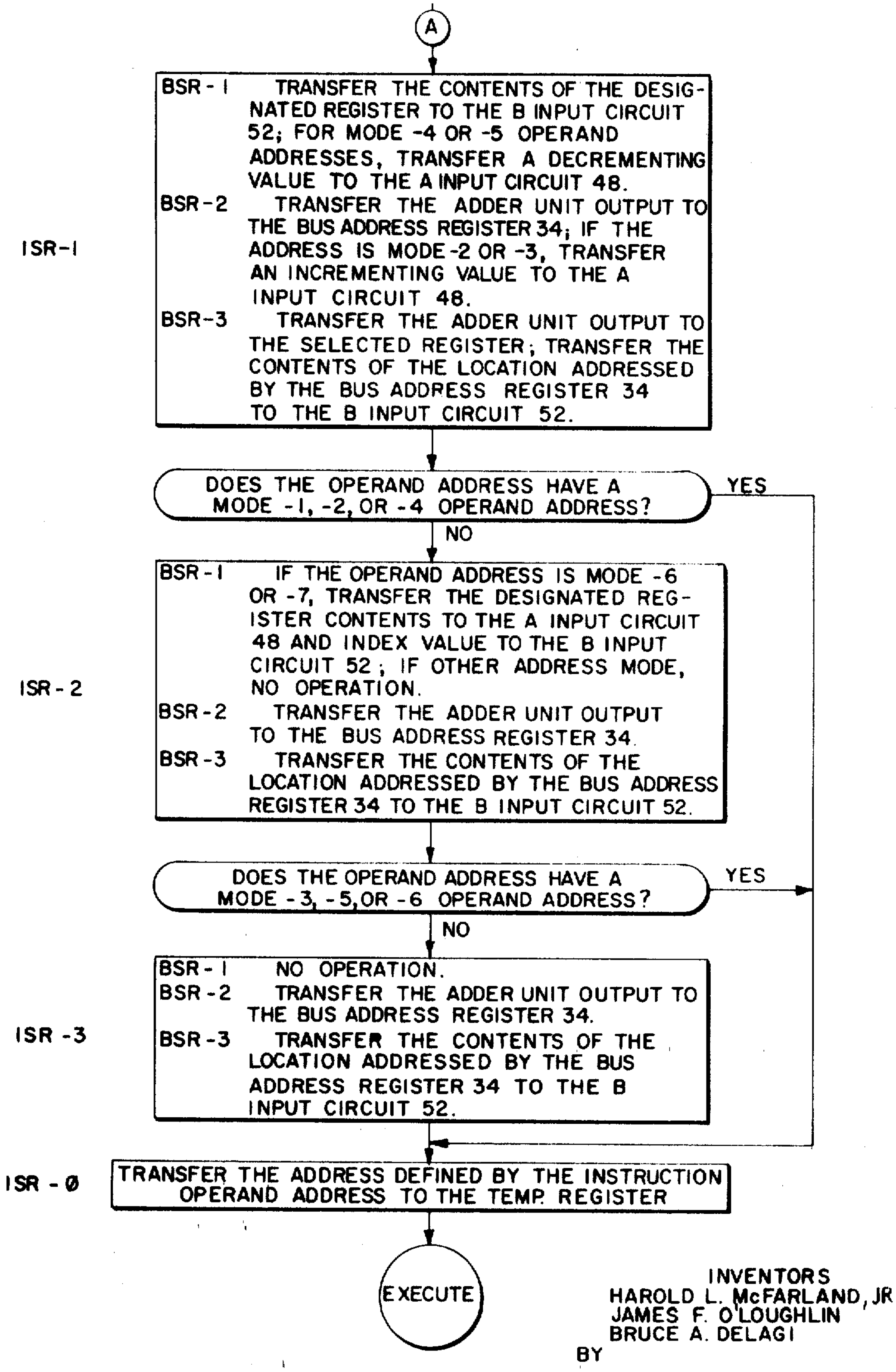

FIG. 6 is a general flow diagram for the "fetch" cycle which obtains an instruction from the memory unit 24 (FIG. 1) and transfers the data defined by the operand address, if any, to the processor unit 22. Each cycle is characterized by a timing signal identified by a mnemonic ISR and BSR and generated by circuitry described with reference to FIG. 9.

When the processor unit 22 (FIG. 2) is energized, and extended ISR–0 state comprising three BSR states is generated by the control unit 60. The contents of the PC register are transferred to the B input circuit 52 during the BSR–1 state. Unless specified otherwise, an unused input circuit produces a zero output. With the A input circuit 48 producing a zero output, the program count passes through the adder unit 46 without modification to the bus address register 34 during a first portion of the BSR–2 state. An incrementing value applied to the A input circuit 48 produces a new program count at the output of the adder unit 46 during a second portion of the BSR–2 state. After this new program count is moved to the PC register in the registe memory 40 during a first portion of the BSR–3 state, the instruction stored at the location addressed by the bus address register 34 is transferred into the instruction register 62 during a second portion of the BSR–3 state.

When the ISR–0 state is completed, the timing unit 66 and control unit 68 produce an ISR–1 state for decoding the instruction in the instruction decoder 64 and for making several decisions. If the instruction is decoded as an RTI or RTS instruction, or a similar instruction, it can be executed immediately. With these instructions, the processor unit 22 diverts to the "execute" cycle shown in FIG. 7. The processor unit 22 may also be diverted to the "term" cycle of FIG. 8 with other instructions.

If the processor unit 22 is not diverted to the "execute" or "term" cycles, the necessary steps to obtain the information defined by the operand address in the JSR instruction are taken.

The control unit 60 uses an extended ISR–1 state comprising three BSR states to initially decode the operand address. The contents of the register identified in the operand address are moved to the B input circuit during the BSR–1 state. A decrementing quantity is coupled to the A input circuit 48 to decrement the value applied to the B input circuit 52 if the operand address is a MODE–4 or –5 operand address. In any case, the adder unit output is transferred to the bus address register 34 during the BSR–2 state. If the operand address is a MODE–2 or –3 operand address, an incrementing quantity is applied to the A input circuit 48 during a second portion of the BSR–2 state. After the output from the adder unit 46 is returned to the register defined in the operand address during a first portion of the BSR–3 state, the contents of the location addressed by the bus address register 34 are transferred to the B input circuit 52. The BSR–3 state is extended until this transfer has been completed.

With MODE–1, –2 or –4 operand addresses, the B input circuit 52 contains data and no further operations are necessary. With MODE–3, –5, –6 or –7 operand addresses, the B input circuit 52 contains an address, and the processor unit enters an ISR–2 state which includes three BSR states. No operation occurs in the BSR–1 state unless the operand address is a MODE–6 or–7 operand address. Either mode caused the PC register to be inplicitly selected and its contents incremented during the ISR–1 state so that the B input circuit contains an index value at the end of the ISR–1 state. During the ISR–2 state, the contents of the register identified in the operand address are moved to the A input circuit 48 for addition to the index value. After the output from the adder unit 46 is transferred to the bus address register 34 during the BSR–2 state, an extended BSR–3 state is used to move the contents of the location addressed by the bus address register 34 to the B input circuit 52.

When the ISR–2 state terminates, the B input circuit 52 contains data if the operand address is a MODE–3, –5 or –6 operand address. No additional addressing operations are necessary. With a MODE–7 operand address, the B input circuit contains a data address; and an ISR–3 state is used. No operations occur during the BSR–1 state. The data address is transferred directly to the bus address register 34 during the BSR–2 state. An extended BSR–3 state moves the data to the B input circuit 52.

A JSR instruction modifies the "fetch" cycle. When the last ISR state required to decode the operand address is started, the control unit 60 modifies the BSR–3 state to omit the transfer of the addressed contents to the B input circuit 52. This modification occurs because the output from the adder unit 46 is the address for the first instruction to be used after the JSR instruction has been completed. With a JSR transfer instruction, the initial subroutine instruction address is stored temporarily in the TEMP register during an ISR–0 state. The processor unit 22 then diverts to the "execute" cycle of FIG. 6 as it also does if the instruction is now a JMP or JSR instruction.

ii. "Execute" Cycle

Processor unit response during the "execute" cycle depends upon the instruction. The response to JSR, RTS and RTI instructions, necessary to understand this invention, can now be described.

JSR Instruction

Referring to FIG. 7A, the control unit 60 initially produces an extended ISR–0 state in response to a JSR instruction in an operating routine and transfers the contents of the SP register (the R6 register) in the register memory 40 to the B input circuit 52. A decrementing value is applied to the A input circuit 48 simultaneously during the BSR–1 state. The decremented value from the adder unit 46 is moved to the bus address register 34 and to the SP register in the register memory 40 during the BSR–2 and BSR–3 states, respectively. When the BSR–3 state is finished, the bus address register 34 addresses a vacant location in the group of contiguous locations defined as block 94 in FIG. 5. During the following BSR–0 and BSR–4 states, the R5 register contents, defined by bits 6, 7 and 8 in the instruction are transferred through the B input circuit 52 to the vacant location.

As previously indicated, any other register in the register memory 40 could be identified by the JSR instruction. During the BSR–5 state, the processor unit 22 waits until the R5 register contents have actually been stored and then terminates the ISR–0 state. Hence, the R5 register contents are transferred into the memory unit 24 during the ISR–0 state by decrementing the SP register contents to define a vacant address in the block 94.

During the following ISR–1 state, the PC register contents are transferred to the B input circuit 52 and then to the R5 register during the ISR–2 state. The address for the first subroutine instruction is transferred from the TEMP register, where it was stored during the "fetch" cycle, to the B input circuit 52 during the ISR–3 state. This new program count is then moved to the PC register during the ISR–4 state. When the ISR–4 state is finished, the PC register contains the address for the first instruction in the subroutine; the R5 register, the address for the next instruction in the operating routine; and the last entry moved to the block 94 is the last contents of the R5 register. This completes the operations required by the JSR instruction so the processor unit completes the "term" cycle. During the next "fetch" cycle, the first instruction in the subroutine is obtained in the block 90 in the memory unit 24 shown in FIG. 5.

RTS Instruction

Each subroutine terminates with an RTS instruction identifying the same register as its related JSR instruction. When the R5 register is designated in the JSR instruction, the RTS instruction has a fixed format. Therefore, a programmer always uses the same instruction as the last instruction in a subroutine. Referring to FIGS. 7A and 7B, the ISR–4 and ISR–5 states generated by the control unit 60 transfer the R5 register contents through the B input circuit 52 to the PC register. During the extended ISR–6 state and the following ISR–7 state, the processor unit 22 moves the last entry in the block 94 (FIG. 5) to the R5 register.

More specifically, during the BSR–1 state in the ISR–6 state, the SP register contents are transferred to the B input circuit 52. As the SP register is decremented before transferring data to the block 94 in the memory unit 24, the SP register contains the address for the last entry. This address is transferred to the bus address register 34 during a first portion of the BSR–2 state. An incrementing value is applied to the A input circuit 48 during second portion of the BSR–2 state, and the incremented address is returned to the SP register during the BSR–3 state, At the end of the BSR–3 state, the B input circuit 52 contains the last entry from the block 94. This entry is transferred to the R5 register during the ISR–7 state. When the ISR–7 state is finished, the PC register contains the address of the operating routine instruction following the JSR instruction. The R5 register contains the last entry from the block 94; and the SP register, the address of the next filled location in the block 94. During the next " fetch" cycle, the instruction in the operating routine which follows the JSR instruction is obtained from one of the blocks 86, 90 or 92 in the memory unit 24 shown in FIG. 5.

RTI Instruction

Whenever the processor unit 22 relinquishes its control over the data processing system after a peripheral request to interrupt the operating routine is granted, the program count and status word for the interrupted operating routine are moved to the next two available memory locations in the block 94. Then the status word and program count for the interruption routine are moved to the status register and the PC register respectively.

All interruption routines terminate with the same RTI instruction. When the instruction is decoded, the processor unit 22 uses ISR–4, –5, –6 and –7 states to transfer the interrupted operating routine program count and status word to the PC register and status register 59. Referring to FIGS. 7B and 7C, an extended ISR–4 state utilizes BSR–1, –2 and –3 states to obtain the operating routine program count from a location in the memory unit 24 defined by the SP register. After the SP register contents are moved to the bus address register 34 during the BSR–1 and BSR–2 states, an incrementing value is applied to the A input circuit 48 and produces an incremented value for return to the SP register during the BSR–3 state. This state is also used to transfer the last entry in the block 94 (the program count) to the B input circuit 52 for transfer to the PC register during the ISR–5 state. An extended ISR–6 state with three BSR states similarly increments the SP register contents and obtains the status word for transfer to the status register 59 during the ISR–7 state. After these operations are finished, the processor unit 22 diverts to the "term" cycle.

Other instructions

If the instruction is one of the other instructions shown in FIG. 3, and is not a JSR, RTI or RTS instruction, the processor unit responds in a manner completely described in the previously identified U.S. Pat. application Ser. No. 21,973.

iii. "Term" Cycle

The third operating cycle for the processor unit 22 is the "-term" cycle diagrammed in FIG. 8. If the priority unit 38 produces a bus request signal as described with reference to FIG. 12, the control unit 60 enters an ISR–0 state.

In the system shown in FIG. 1, the processor unit 22 relinquishes control of the system to the peripheral unit. Once this control has passed to the peripheral unit, a previously stored address is transmitted from the peripheral unit into the TEMP register in the register memory 40 through the B input circuit 52. This address serves as an "interruption vector" to identify the storage locations in the memory unit for the interruption routine address and status word. After this transfer to the B input circuit 52 is completed, the processor unit 22 regains control of the system and enters an ISR–2 state. It is apparent that other steps can be used to obtain this or equivalent information and that the circuitry and operation described for making the transfer is applicable with only minor modification notwithstanding the operations or circuitry used to obtain this information.

The ISR–2 state comprises six BSR states. When the control unit 60 produces the BSR–1 state, the SP register contents are moved to the B input circuit 52. A decrementing value is moved to the A input circuit 48. During the BSR–2 state, the decremented value from the adder unit 46 is transferred to the bus address register 34 to identify the next available location in the block 94 (FIG. 5). The decremented value is also returned to the SP register during a BSR–3 state. After an inactive, intermediate BSR–0 state, the control unit 60 moves an eight-bit status word from the status register 59 to the memory unit 24 over the bus 30 for storage in the block 94 (FIG. 5) at the location defined by the bus address register 34. An extended BSR–7 state stops processor unit operation until the status word is stored.

Now the control unit 60 produces an ISR–3 state which also comprises six BSR states to transfer the PC register contents to the memory unit 24. More specifically, the SP register contents are decremented in the arithmetic unit 44 during a BSR–1 state, transferred to the bus address register 34 during a BSR–2 state and returned to the SP register during a BSR–3 state. An intermediate BSR–0 state, provided to transfer the PC register contents to the B input circuit 52, is followed by a BSR–6 state which moves the program count onto the bus 30. Then an extended BSR–7 state permits the program count to actually be stored in the memory unit 24 at the next vacant location in the block 94 (FIG. 5). When the ISR–3 state is finished, the status word and program count for the interrupted operating routine are stored in contiguous memory locations.

An ISR–4 state comprising three BSR states moves the interruption vector from the TEMP register to the B input circuit 52 during a BSR–1 state. During a first portion of the BSR–2 state, the interruption vector is moved to the bus address register 34 and then incremented during a second portion of the BSR–2 state. The control unit 60 utilizes a BSR–3 state to return the incremented interruption vector to the TEMP register. In addition, the contents of the location defined by the bus address register 34 are transferred to the B input circuit 52. Therefore, the B input unit 52 stores the address for the first instruction in the interruption routine. This address is transferred to the PC register when the control unit 60 produces an ISR–5 state.

The incremented interruption vector in the TEMP register is the address for the status word associated with the interruption routine. A new status word must be provided because the interruption routine usually has different priority and condition codes from those of the operating routine.

An ISR–6 state comprising three BSR states is used to transfer this incremented interruption vector to the B input circuit 52 and to the bus address register 34 during the BSR–1 and BSR–2 states. The BSR–2 state is also used to increment the B input circuit contents for return to the TEMP register during the BSR–3 state after which the new status word is moved to the B input circuit 52. It is transferred to the status register 59 through the arithmetic unit 44 during an ISR–7 state.

After the ISR–7 state is finished, the processor unit 22 has completed the "term" cycle and returns to the "fetch" cycle. The next instruction obtained in response to the PC register contents and transferred to the processor unit 22 is the first instruction in the interruption routine. If no interruptions occur, none of these steps occur; and the processor unit produces a "fetch" cycle to obtain the next operating routine instruction after the "execute" cycle.

iv. Summary of Operations

As the processor unit goes through the "fetch," "execute," and "term" cycles for each instruction in the interruption routine, a higher priority interruption can be accepted by the processor unit 22. However, the next instruction address and status word in the first interruption routine are saved in the block 94 (FIG. 5). When the RTI instruction in the second interruption routine is executed, the PC register contents and status word for the first interruption routine are returned to the processor unit 22. It is also apparent that all operating routines, whether they are operating programs, subroutines or interruption routines, can be interrupted via the status unit 58 if the interrupting condition has sufficient priority.

While the PC register and status register contents are both transferred to the block 94 (FIG. 5), the PC register contents are transferred to the R5 register in response to a JSR instruction. Intermediate storage in the R5 register permits the PC register contents for the operating routine containing the JSR instruction to be used or modified by the subroutine. For example, certain operating program instructions could be omitted by advancing the R5 register contents if certain conditions are met during the subroutine. When the RTS instruction is subsequently executed, the modified PC register contents are obtained from the R5 register thereby omitting some instructions.

As all information is stored in the block 94 chronologically, any interruption routine or subroutine can be used before any previous operating routine is completed. Using RTS and RTI instructions in each subroutine and interruption routine assures the last-operating routine to be started is the first one to be completed. As a result, the data processing system can handle any number and organization of uncompleted subroutines and interruption routines in an operating program without increasing programming complexity and without increasing the complexity of the processor unit circuits.

d. Timing Unit

As discussed with reference to FIGS. 6, 7 and 8, each operation in the processor unit 22 is defined and controlled by an ISR or BSR time state generated by the timing unit 66 in FIG. 2. Each timing state depends upon several factors including the previous timing state, the instruction and conditions in the processor unit 22. A detailed understanding how each timing state is produced is not necessary to appreciate this invention. However, the circuitry and timing signals shown in FIGS. 9A and 9B in conjunction with the flow diagrams of FIGS. 6; 7 and 8 enable a more through understanding and will permit a person of ordinary skill in the art to produce the specific control circuitry necessary to provide the described processor unit operation.

Referring to FIG. 9B, the timing unit 66 comprises a timing circuit 76, a clock 78 and two signal generators 80 and 82. FIG. 9A shows the relationship of the CLK signals from the clock 78 and the SCLK signals from the timing circuit 76. Each change in the CLK signals defines a read or write cycle boundary with a specific read or write cycle being determined by the relationship of the SCLK and CLK signals. As shown in FIG. 9A, four read/write cycles, R/W–0, R/W–1, R/W–2 and R/W–3 are generated during each SCLK cycle from the timing circuit 76. The R/W–2 cycle is always a write cycle while the clock 78 may be stopped during an R/W–3 cycle to extend a BSR state as when data is transferred from the processor unit. Each group of four R/W cycles together with other signals from the control unit 60 defines a shift register state represented by a signal on one of the output conductors from one of the generators 80 or 82.

More specifically, the SCLK signals from the timing circuit 76 and signals from the control unit 60 are applied to the instruction shift register signal generator 80 and a bus shift register signal generator 82. The generator 80 produces ISR signals while the generator 82 produces BSR signals. A CLEAR signal applied to one of the generators produces a "-zero" state. Otherwise, each generator normally sequences from one state to another with the specific sequences necessary to operate the processor unit 22 being shown in FIGs. 6, 7 and 8. These FIGS. illustrate how each timing state depends upon prior conditions and when the sequence may be modified.

f. Arithmetic Unit

Referring to FIG. 10, the adder unit 46 comprises a plurality of bit adders, bit adders 100 and 102 being shown by way of example. Each adder has three input sources: the A and B inputs circuits 48 and 52, respectively, and the carry output from the preceding bit adder. For example, the signal $C_{n11}$ is applied to the bit adder 100. Each bit adder generates a sum and carry output such as the $S_n$ and $C_n$ signals from the bit adder 100.

The A input circuit 48 comprises an input latch circuit for each bit adder. More specifically, the A input circuit 48 for the bit adder 102 ($BIT_0$) comprises an OR circuit 104. Its output is transferred to one input of the bit adder 102 and is latched by coupling it through an AND circuit 108. This AND circuit is normally enabled by a LATCH A signal from the data path control unit 70 shown in FIG. 2. The latch A signal is dropped to disable the AND circuit 108 and change the output from the A input circuit 48. An AND circuit 110, enabled by a GATE $\overline{A\text{–}50}$ signal from the data path control unit 70, transfers the signal on the bus 50 through an inverter 112 to the bit adder 102. A signal on the bus 49 from the register memory 40 is coupled through an AND circuit 114 by a GATE A–49(0) signal. The signal is also coupled through an inverter 116 and AND circuit 118 by a GATE $\overline{A\text{–}49(\phi)}$ signal. GATE A–49(1-15) and GATE $\overline{A\text{–}49(1\text{—}15)}$ signals are applied to AND circuits analogous to the AND circuits 114 and 118, respectively, to transfer the remaining signals on the bus 49 or the respective inverted signals to the other bit adders.

Using two sets of gating signals for the A input circuit 48 permits data from the B input circuit 52 to be incremented or decremented in the adder unit 46. When the data path control unit 70 produces the GATE A–49(0) and GATE $\overline{A\text{–}49(\phi)}$ signals simultaneously, a "one" is added to the B input circuit contents. An incrementing value of "two" is produced by additionally transferring a "one" to the carry input of the bit adder 102. If the arithmetic control unit 70 produces all four GATE A–49 signals simultaneously, the two's complement of (+1) is applied to the adder unit 46. This decrements the B input circuit contents by "one." Producing the GATE A–49(1-15) and GATE $\overline{A\text{–}49(1\text{—}15)}$ signals simultaneously decrements the B input circuit contents by "two."

Three input signals control the B input circuit 52, and the circuitry for $BIT_n$ is typical. An OR circuit 120 provides the B input to the bit adder 100 and is latched by coupling its output through an AND circuit 124 normally enabled by a LATCH B signal. This signal is disabled to change the output from the B input circuit 52. A signal on the bus 50 is gated through an AND circuit 126 by a GATE B–50 signal while a signal on the bus 49 is gated through an AND circuit 128 by a GATE B–49 signal.

Each sum output from the adder unit 46 is coupled through the gating unit 54 by one of three signals. When a GATE ADD signal is generated by the arithmetic control unit 70 (FIG. 2), an AND-circuit 130 couples the $S_n$ output from the bit adder 100 through an OR-circuit 132 onto the bus 56. A GATE RIGHT signal applied to the AND-circuit 134 moves the $S_{n+1}$ through the OR circuit 132 and shifts each signal from a bit adder one position to the right. A similar shift to the left by one position is obtained by producing a GATE LEFT signal. This signal enables the AND-circuit 136 to transfer the $S_{n11}$ signal through the OR-circuit 132 onto the bus 56. Hence, these signals provide two shifting operations which become rotating operations if the first and last bit adders are interconnected through the gating unit 54.

g. Register Memory

FIG. 11 illustrates one embodiment of the register memory 40 and the register memory control unit 72. In this particular embodiment the register memory 40 comprises a plurality of flip-flop circuits which each comprise a plurality of selective flip-flops and a selection matrix. For example, a flip-flop circuit 140 provides $BIT_n$ on the bus 49 for any register in the register memory 40 while flip-flop circuits 142 and 144 store $BIT_1$ and $BIT_0$ respectively for each register. Therefore, one flip-flop circuit stores one bit for each register and contains as many individual flip-flops as there are registers. If the processor unit 22 responds to 16-bit words, the register memory 40 comprises 16 flip-flop circuits with each circuit containing at least 10 flip-flops to store an equivalent bit in the R0 through R7 SOURCE and TEMP registers.

A specific register in the register memory 40 is selected by decoding the appropriate register selection bits, the IR–0, IR–1 and IR–2 bits in the operand address and the IR–6, IR–7 and IR–8 bits in the register portion of the JSR instruction, and then selecting the appropriate flip-flop in each flip-flop circuit. Each register selection bit from the instruction register 62 (FIG. 2) is gated through a plurality of AND circuits in the register memory control unit 72 enabled by signals from the control unit 60.

When the control unit 60 enables AND-circuits 146, 148 and 150, the IR–0, IR–1 and IR–2 signals are coupled through OR-circuits 152, 154 and 156 to a decoder unit 158. The output from the decoder unit 158 energizes the selection matrix in each flip-flop circuit to select the proper flip-flop to permit input signals to be coupled thereto and output signals to be coupled therefrom. As a result, corresponding flip-flops in each flip-flop circuit are coupled to the bus 49. For example, if the R0 register is selected in the JSR instruction operand address, the first flip-flop in each flip-flop circuit is coupled to the bus 49. Therefore, the signals on the 49(0), 049(1) and 49($n$) wires represent $BIT_0$, $BIT_1$ and $BIT_n$, respectively. The register identified by bits 6, 7 and 8 in the JSR instruction is similarly obtained by enabling AND-circuits 160, 162 and 164 to transfer the IR–6, IR–7 and IR–8 signals through the OR-circuits 152, 154 and 156 to the decoder unit 158.

As one register is always selected, the contents of the selected in the register memory 40 always appear on the bus 49 to the A and B input circuits 48 and 52. Register contents are changed when the control unit 60 produces a WRITE signal. The set and reset inputs for each selected flip-flop are coupled to the common set(s) and reset(R) inputs to the flip-flop circuits. These common set and reset inputs are coupled through identical writing circuits for each flip-flop circuit to the bus 56, the writing circuit for the flip-flop 140 being typical. The WRITE signal is applied to AND circuits 166 and 168 while the data representing $BIT_n$ on the wire 56($n$) from the bus 56 is applied to the AND-circuit 166. If the signal on this wire is a logical "one," the selected flip-flop is set when the AND-circuits 166 and 168 are enabled by the WRITE signal. The reset input is not energized because the output from the AND-circuit 166 is coupled through an inverter 170 to the AND-circuit 168. A logical "zero" on the wire 56($n$) energizes the AND-circuit 168 to reset the selected flip-flop in the flip-flop circuit 140.

h. Status Unit

FIG. 12 illustrates one embodiment of the interruption priority unit 38 and the status unit 58 including the status register 59 in the processor unit 22 of FIG. 2.

Processor unit priority is altered by signals on wires 56(5), 56(6) and 56(7) when a status word is on the bus 56. These three signals are stored in clocked flip-flops 200, 202 and 204 when a CLKT pulse is generated by the control unit. The CLKT pulse is generated when the status register 59 is implicitly addressed during the ISR–7 state of an RTI instruction "execute" cycle or of the "term" cycle or during the ISR–4 state of an "execute" cycle when an instruction operand address explicity identifies the status register and the processor is ready to transfer to the "term" cycle. Each CLKT pulse occurs as the timing unit changes from the one ISR state to the next. Hence, the clocked flip-flops 200, 202 and 204 define one of eight processor unit priorities which are used by a comparator circuit 206.

The comparator unit 206 is also responsive to signals from flip-flops 208, 210, 212 and 214. In a data processing system as shown in FIG. 1, it is possible for a peripheral unit to gain control of the system and transmit information to or from the bus under its own control. Each peripheral unit capable of controlling the system is coupled to one of four BR wires depending upon its priority. When it wants to take control of the system, a generated BR signal is clocked into one of the flip-flops by a CLKBR pulse. This pulse is generated at the beginning of a series of BSR states in the processor unit or like operation in a peripheral unit as data is transferred over the bus 30 or with each change of a shift register state as defined by the SCLK signals from the timing circuit 76 if the processor unit has relinquished control of the system to await a BR signal from a peripheral unit indicated that information has been or will be moved onto the bus 30.

When a BR signal has a greater priority than the processor unit, a GRANT pulse is produced a fixed time later by the control unit 60 at the end of an ISR–0 state of the "term" cycle. This causes a signal to be transferred through a gate 216 onto a reserved bus wire to effect a transfer of system control to the requesting device. If the peripheral unit is going to require the processor unit to use an interruption routine, it transfers the interruption vector to the processor unit.

The C, V, Z and N condition codes appear on wires 56(0) through 56(3) when the bus 56 contains a status word. As the circuitry for the Z bit is exemplary, it is shown in FIG. 10. The Z bit is set if the data on the bus 56 is zero after an instruction has been executed. All the data is coupled through inverters represented by inverter 218 to energize an AND-circuit 220 in conjunction with a normally enabling CL signal. A clocked flip-flop 224 is set or reset during the next CLKC pulse. Internal processor conditions for generating the CLKC pulse are identical to those for the CLKT pulse. The CLKC pulse is also produced during an "execute" cycle ISR–4 state for certain instructions requiring condition codes modification. Another flip-flop for the C bit, analogous to the flip-flop 224, may be additionally clocked for still other instructions.

When it is desired to transfer the status word onto the bus 30, a CSTB signal enables a gate circuit 226, including an AND-circuit 228 for the Z bit. The CSTB signal is generated during the BSR–6 and BSR–7 states of a "term" cycle ISR–2 state when the status register contents are transferred to the memory unit. It is also produced when data on the bus 30 is being transferred to the memory unit from the status register 59 in response to an instruction which explicitly or implicitly addresses the status register 59.

Condition codes or a specific code are transferred into the condition code flip-flops, like the flip-flop 224, by a CSTD signal. This signal enables an AND-circuit 230 to set or reset the flip-flop 224 in accordance with the output from the adder unit 46 (FIG. 2), specifically the $S_{02}$ signal. The CSTD signal is generated under the conditions as the CLKT pulse, but it exists for an entire ISR state.

Therefore, the status register 59 comprises eight clocked flip-flops and associated gating circuits which are enabled by one of several, mutually exclusive pulses produced by the control circuit 60. One set of flip-flops stores priority information; the other, condition codes. Each group can be set independently or together with the priority flip-flops usually being set only when a priority change is required as when an interruption routine is initiated or completed.

2. Examples a. Operating Programs, Subroutines and Interruption Routines

An analysis of FIG. 13 shows that the processor unit (FIG. 2) permits several operating routines to be "nested" and permits the use of a subroutine which has previously been only partially completed. Further, this example shows that data in the operating program can be transferred to a subroutine easily.

The following discussion is limited to describing the movement of information within the processor unit at the completion of relevant ISR timing states. Additional details related to these information transfers can be obtained by referring back to FIGS. 6 through 8 and the related discussion. It is assumed locations 2000 through 2003 do not contain relevant information and that the registers in the processor unit have the following contents:

TABLE III

| Register | Contents |
|---|---|
| Status register 59 | 0 |
| Register memory 40 | |
| R0 register | 477 |
| R6 (SP) register | 2004 |
| R7 (PC) register | 1 |

It is also assumed that one peripheral unit is a printer, which is identified by a R2(1) operand address and capable of transmitting an interruption vector 500.

The processor unit obtains and executes the operating program instructions INST-1 and INST-2. At the beginning of the next "fetch" cycle, the PC register contains a "3" so the JSR R5, RO(1) instruction is obtained and decoded. In addition, 110, contents are incremented to 4 during the ISR-0 and first ISR-1 states. The n the processor uses consecutive ISR-1 and ISR-0 states to decode the R0(1) operand address. As a result, the R0 register contents, 477, are moved to the bus address register 34. A first COSINE subroutine instruction address, is moved to the TEMP register. During the "execute" cycle, the SP register contents are decremented and moved to the bus address register 34 and the SP register in order to store the R5 register contents, (R5), in the memory unit 24 at a location 2003. ISR-1 and ISR-2 states are used by the processor unit 22 to move the PC register contents, 4, to the R5 register while ISR-3 and ISR-4 states move the TEMP register contents, 110, to the PC register.

Therefore, when the "execute" cycle is finished, the PC register contains the address for the first instruction in the COSINE subroutine. Assume that the first two subroutine instructions are executed, but that the printer makes a request which is honored by the comparator circuit 206 (FIG. 12). When the "term" cycle associated with the COS-2 instruction is reached, the processor unit 22 relinquishes system control during the ISR-1 state. Then it waits for the printer to transmit the interruption vector, 500, to the TEMP register and for system control to be returned.

The processor unit 22 uses ISR-2 and ISR-3 states to move the status register and PC register contents to the next two vacant locations in the memory, locations 2002 and 2001, respectively, obtained by decrementing the SP register contents during each state. The new PC register contents are obtained during the ISR-4 and ISR-5 states by using the interruption vector, 500, as an address to obtain the number 200 for transfer to the PC register and by incrementing the TEMP register contents to 501. Then the ISR-6 and ISR-7 states are used to transfer the new status word, 100, to the status register 59. At the end of the "term" cycle, the PC register contents, 200, identify the address for the first instruction in the interruption routine which is obtained during the next "fetch" cycle.

When the PC register contains 205 and the processor unit 22 begins a "fetch" cycle, the PC register contents are incremented to 206 during the ISR-0 state while the JSR R5, R0(1) instruction is decoded during the ISR-1 state. Previously described steps move the new PC register contents, 110, through the TEMP register to the PC register while the old R5 register contents, 4, are transferred to the location 2000; and the old PC register contents, 206, to the R5 register. At this time, four uncompleted operating routines are present in the memory unit 24 including the operating program, its related COSINE subroutine, the interruption routine and its related COSINE subroutine. These operating routines are nested and completed in reverse order in accordance with this invention as now described.

When the program counter contains 117, the next "fetch" cycle obtains the RTS R5 instruction and increments the PC register contents to 120. The processor unit produces an "execute" cycle to terminate the COSINE subroutine and transfer the processor unit 22 back to the interruption routine. More specifically, ISR-4 and ISR-5 states are utilized to transfer to the number in the R5 register, 206, back to the PC register. The last number transferred to the memory location 2000 is moved to the R5 register, and the SP register is incremented during the ISR-6 and ISR-7 states. When the RTS R5 instruction has been executed, the PC register contains the address for the next interruption routine instruction. The SP register has been incremented to 2001 and the R5 register contains the address of the next-operating program instruction.

An RTI instruction is stored at memory location 206, so the processor unit 22 immediately terminates the interruption routine and transfers the processor unit 22 to the COSINE subroutine related to the operating program instruction. More specifically, the PC register is incremented to 207 and the RTI instruction is obtained from memory location 206 during the "fetch" cycle. Then an ISR-4 and ISR-5 state are produced by the processor unit, and the contents of the memory location 2001 are transferred to the PC register. In addition, the SP register contents are incremented to 2002. Therefore, the PC register contents, 112, identify the address of the COSINE subroutine instruction which would have been executed if the interrupt had not occurred The processor unit status word for the operating program is transferred back to the status register 59 from location 2002 during the ISR-6 and ISR-7 states; and the SP register is incremented to 2003.

Now the PC register contents, 112, enable the COSINE subroutine to be completed. When the PC register contains 117, the processor unit fetches the RTS R5 instruction to transfer the R5 register contents to the PC register and the contents of the location 2003 to the R5 register during ISR-4 through ISR-7 states. In addition, the SP register is incremented to 2004, its original value.

Now the processor unit 22 continues executing the instructions in the operating program by first executing the INST-4 instruction. When this is completed, the JSR R5, R7(3) instruction is obtained during a "fetch" cycle in order to cause the processor unit 22 to execute a PRINT subroutine. With this instruction format, memory location 6 contains the address for the first subroutine instruction while memory location 7 contains the address of data to be printed. Hence, it is necessary to transfer this information to the PRINT subroutine.

After the PC register is incremented to 6 and the JSR instruction is decoded during the "fetch" cycle, an ISR-1 and ISR-0 state are used to decode the operand address R7(3). During the ISR-1 state, the R7(PC) register contents, 6, are transferred to the bus address register 34 and the PC register contents are incremented to 7 as this is a MODE-3 operand address. The contents of memory location 6, the number 120, is transferred to the B input circuit 52 (FIG. 2) for transfer to the TEMP register during the ISR-0 state. During the "execute" cycle, the SP register contents are decremented to 2003 and transferred to the bus address register 34 and the SP register during the ISR-0 state. In addition, the R5 register contents are transferred to the location 2003. Then ISR-1 and ISR-2 states are used by the processor unit 22 to transfer the PC register contents, 7, to the R5 register. ISR-3 and ISR-4 states move the TEMP register contents, 120, to the PC register. Therefore, the PC register contains the address for the first instruction in the PRINT subroutine.

Memory location 120 contains a MOV R5(3), R2(1) instruction with the second operand address, R2(1), identifying the printer. When the first operand address, R5(3) is decoded, the number 7 is transferred from the R5 register to the bus address register 34 and then incremented to 10 for return to the R5 register during the ISR–1 state. The contents of memory location 7, are transferred to the bus address register 34 during the ISR–2 state to permit the return of the data, X, to the B circuit 52 for transfer through the processor unit 22 to the printer after the second address is decoded.

As the PC register now equals 121, the next "fetch" cycle causes the PC register to be incremented to 122 and the RTS R5 instruction to be decoded. During the ISR–4 and ISR–5 states, the R5 register contents, 10, are transferred back to the PC register. After the contents of memory location 2003 are tranferred back to the R5 register, the SP register is incremented to 2004 during the ISR–6 and ISR–7 states. During the next "fetch " cycle, the processor unit 22 obtains the HALT instruction and stops operating.

Therefore, several operating routines have been nested and a subroutine has been recalled. In addition, data in the operating program have been transferred to a subroutine. With specific reference to transferring data, the R7(3) and R5(3) operand addresses in the JSR and MOV instructions move the first subroutine address to the PC register and the data address to the R5 register for subsequent use. As the R5 register contents are incremented by the MOV instruction, the PC register contents after the RTS R5 instruction define the next instruction in the operating program.

b. Co-routining

Another operating advantage obtained with this invention is the ability to "co-routine." In "co-routining" a first operating routine is partially executed. Then the processor unit 22 executes a second routine using a special JSR instruction, JSR R7 R6(2). This instruction can then be used in the second operating routine to return the processor unit 22 to the first operating routine instruction following the JSR instruction. An instruction must be used to transfer the address for the first instruction in the second operating routine to a memory location defined by the SP register contents.

Assume the following two operating routines exist in the memory unit (FIG. 13):

| FIRST OPERATING ROUTINE | | SECOND OPERATING ROUTINE | |
|---|---|---|---|
| Memory location | Contents | Memory location | Contents |
| 1100 | MOV "1200," R6(4) | 1200 | |
| 1101 | | 1201 | |
| 1102 | JSR R7, R6(3) | 1202 | |
| 1103 | | 1203 | JSR R7, R6(3) |
| 1104 | | 1204 | |
| | | . | |
| 1105 | JSR R7, R6(3) | . | |
| | | . | |

and that the SP register contains 2004.

The number 1200 is moved to the memory location 2003 by the processor unit 22 in response to the MOV "1200," R6(4) instruction. Then the next instruction is executed during which the PC register is incremented to 1102. When the JSR R7, R6(3) instruction is obtained, the PC register is incremented to 1103 during the "fetch" cycle. The SP(R6) register contents, 2003, are transferred to the bus address register 34 (FIG. 2) and incremented to 2004. In addition, the ISR–1 state is used to transfer the contents, 1200, of memory location 2003 to the B input circuit for transfer to the TEMP register during the ISR–0 state.

During the ISR–0 state of the "execute" cycle, the SP register contents are again decremented to 2003 to define the storage location for the R7(PC) register contents, 1103. The PC register contents are then moved through the B input circuit 52 and returned during the ISR–1 and ISR–2 states. During the ISR–3 and ISR–4 states, the TEMP register contents, 1200, are moved to the PC register so the processor unit obtains the first instruction in the second operating routine during the next "fetch" cycle.

In effect, the processor unit 22 responds to the JSR R7, R6(3) instruction by exchanging the contents of the PC register and the memory location identified by the SP register contents. When the JSR R7, R6(3) instruction at memory location 1203 is obtained, the processor unit 22 effects a similar exchange. The memory location 2003 gets the number 1204 while the number 1103 is transferred to the PC register. A similar response returns the processor unit 22 to the second operating routine when the JSR R7, R6(3) instruction at location 1105 is obtained and executed. Then the processor unit continues to operate with the second operating routine. Hence, co-routining permits the processor unit to execute instructions obtained from the locations as follows: 110 through 1102, 1200 through 1203, 1102 through 1105, and 1204 and following. Co-routining does not require difficult programming in this invention; it is only necessary to use the JSR instruction modified by using the R7, rather than the R5, register as the intermediate location.

In summary, these examples and the data processing system description and organization illustrate how a processor unit operates with different operating routines, each of which is only partially completed. This is accomplished by storing PC register and status register contents in a block of memory locations which are identified by the SP register or equivalent. If program count modification of an operating routine containing a JSR instruction may be necessary, another register with a fixed address can be used as a first storage location for the program count.

When a subroutine or interruption routine is finished, the stored program count for the previous operating routine and status word, if the priority is changed, are transferred back to the processor unit and their storage locations are vacated. As is apparent, a relatively simple processor unit permits multiple operating routines to exist in an uncompleted state without adversely increasing programming complexity. Multiple subroutines and interruption routines can be "nested" in uncompleted states without requiring added program complexity. Finally, the processor unit enables data to be transferred from an operating routine to a subroutine.

While this invention has been described with reference to a specific data processing system, it is obvious that it may be adapted in other systems with the same advantages. For example, it was previously indicated that the steps of the processor unit's relinquishing control to peripheral to obtain the interrupting vector may not be necessary as the processor unit itself may control the interruption. Other processor units and processor unit operation which use instructions with different formats than those specifically disclosed may be modified by implementing this invention. The timing and other functionally described circuits may be modified without affecting the data processing system response. Therefore, it is desired to cover all such modifications and variations as fall within the true spirit and scope of the appended claims.

What is claimed as new and desired to be secured by Letters Patent of the United States is:

1. A data processing system including a memory unit for storing related operating routine instructions as operating programs subroutines and interruption routines and a processor unit for processing instructions conveyed thereto in sequence from locations in said memory unit identified by a program counter, said processor unit additionally comprising:

A. a succession of vacant locations in said memory unit,

B. a register for providing addresses of the vacant locations in said memory unit, C. a control unit responsive to first and second transfer signals which identify memory locations for subroutines and interruption routines, respectively, said control unit modifying said program counter to identify an address for one of the subroutines and interruption routine instructions, and D. a transfer unit responsive to said register and said control unit for storing return information in said memory unit at a location identified by said register, the return information including said program counter contents for the preceding operating routine.

2. A data processing system as recited in claim 1 wherein each subroutine and interruption routine includes a return instruction, said control unit additionally comprising means responsive to the return instruction for causing A. said transfer unit to transfer the return information to said processor unit from said memory, and B. said register to identify the next-occupied contiguous location in said memory unit.

3. A data processing system as recited in claim 2 wherein an operating routine instruction produces the first transfer signal and the last subroutine instruction is a subroutine return instruction, said processor unit additionally comprising a second register coupled to said transfer unit, signals being conveyed between said second register and the memory location identified by said first register and between said program counter and said second register in response to the operating routine instruction and subroutine return instruction.

4. A data processing system as recited in claim 3 wherein the return instruction for the second transfer signal is an interruption turn instruction and said processor unit additionally comprises a third register for storing processor unit operating information, said transfer unit and said first register being responsive to the second transfer signal and the interruption return instruction for conveying signals between said program counter and the memory location identified by said first register and between said third register and another memory location identified by said first register.

5. In a data processing system including a plurality of addressed memory locations for storing instructions and data in blocks of contiguous locations and a processor unit including a program counter for selecting instructions and data in a first memory block for conveyance to and processing in the processor unit and adapted to obtain instructions from a second memory block in response to a transfer instruction, said processor unit comprising:

A. a first register for storing an address for a third memory block,

B. a second register,

C. a transfer unit coupled to said first and second registers and responsive to the transfer instruction for transferring 1. said second register contents to the memory location identified by said first register, 2. said program counter contents to said second register, and 3. an address in a second memory block identified by the transfer instruction to said program counter, said processor unit thereafter obtaining instructions from the second memory block, and D. means responsive to the transfer instruction for modifying said first register contents to identify a next vacant contiguous memory location in the third memory block.

6. A data processing system as recited in claim 5 wherein the last instruction in the second memory block is a return instruction, A. said transfer unit additionally comprising means responsive to the return instruction for transferring 1. said second register contents to said program counter, and 2. the contents of the third memory block to said second register to thereby return processor unit execution to the instruction in the first memory block following the transfer instruction, and B. said register-modifying means causing said first register to identify a previously used contiguous address in the third memory block.

7. A data processing system as recited in claim 6 including means responsive to a peripheral unit for generating an interruption address in a fourth memory block, A. said transfer unit additionally comprising means responsive to the interruption address for transferring 1. said program counter contents representing the next instruction in the interrupted instructions to the address in the third memory block identified by said first register, and 2. the interruption address to said program counter for causing the processor unit to obtain the next instruction from the fourth memory block, and B. said register-modifying means causing said first register to identify a vacant contiguous address in the third memory block for storing said program counter contents.

8. A data processing system as recited in claim 7 wherein the last instruction in the fourth memory block is a second return instruction, A. said transfer unit additionally comprising means responsive to the second return instruction for transferring the last contents of the third memory block to said program counter so the processor unit obtains the next instruction and, B. said register-modifying means causing said first register to identify a previously used contiguous address in the third memory block.

9. A data processing system as recited in claim 7 wherein said processor unit includes a status word register and said peripheral-responsive means also generates a status word address, A. said interruption-address-responsive means being responsive to the status word address for transferring said status word register contents to a location in the third memory block identified by said first register, and B. said register-modifying means causing said first register to sequentially define the next two vacant contiguous third memory block core locations for storing said status word register contents and said program counter contents.

10. A data processing system as recited in claim 9 wherein the last instruction in the fourth memory block is a return instruction, A. said transfer unit additionally comprising means responsive to the second return instruction for transferring the contents of the last two locations in the third memory block to said status register and said program counter, and B. said register-modifying means being responsive to the return instruction for causing said first register to identify a previously used address in the third memory block contiguous to the last two locations.

11. A data processing system comprising:

A. a memory unit including a plurality of addressed locations for storing first and second sets of instructions in first and second blocks of contiguous memory locations respectively, said second instruction sets constituting subroutines, and B. a processor unit processing the instructions including 1. a first register comprising a program counter for addressing memory locations in sequence, 2. a second register for identifying contiguous locations in a third memory block, and 3. a third register, 4. an arithmetic unit responsive to said program counter for sequentially executing instructions in the first memory block, one instruction being a transfer instruction with a subroutine address for a first instruction in the second memory block to cause execution of one subroutine, 5. means for modifying said second register contents to define the next vacant contiguous third memory block location, 6. a transfer unit responsive to the transfer instruction for a. first transferring said third register contents to the location identified by said second register, b. secondly, transferring said program counter contents to said third register, and c. thirdly, transferring the subroutine address to said program counter whereby said arithmetic unit obtains the first subroutine instruction.

12. A data processing system as recited in claim 11 wherein the last subroutine instruction is a subroutine return instruction, additionally comprising:

A. said transfer unit being responsive to the return instruction for
   1. transferring said third register contents to said program counter, and
   2. transferring said third memory block location contents defined by said second register to said third register, and
B. said modifying means being responsive to the return instruction for causing said second register to define the next contiguous occupied memory location whereby said processor unit obtains the next instruction from the first set of instructions.

13. A data processing system as recited in claim 12 wherein said modifying means causes said second register contents to identify the next contiguous vacant locations in the third memory block prior to a transfer in response to a subroutine transfer instruction to identify the next contiguous occupied location in the third memory block after a transfer in response to a subroutine return instruction.

14. A data processing system as recited in claim 12 wherein said processor unit additionally comprises a temporary register for storing the subroutine address until said first and second transfers are completely by said transfer unit.

15. A data processing system as recited in claim 14 wherein the subroutine address is stored in a location identified by said program counter, said processor unit additionally comprising means responsive to a subroutine address including said program counter for transferring the contents of a first location contiguous to the subroutine transfer instruction to said program counter and a second location contiguous to said first location to said third register.

16. A data processing system as recited in claim 14 wherein the subroutine transfer instruction designates the last contiguous location in the third memory block as containing a subroutine address and said program counter as said third register, said transfer means being responsive to the subroutine transfer instruction for exchanging the contents of the location identified by said second register and said program counter.

17. A data processing system as recited in claim 14 additionally comprising interrupting signal-generating means for generating an address in a fourth memory block and a status word and a status register in said processor unit for storing a status word, the fourth memory block containing an interruption subroutine and said processor unit additionally comprising:

A. a decoder means responsive to said interrupting signal-generating means for causing said transfer unit to
   1. transfer said program counter contents to another vacant contiguous memory location in the third memory block, and
      i. transfer the stored status word to a vacant contiguous memory location in the third memory block.
      ii. transfer the address for the interrupting routine to said program counter, and
B. said altering means being responsive to said decoder for causing said second register to provide addresses for the next two vacant contiguous locations in the third memory block to enable storage of said program counter contents and status word.

18. A data processing system as recited in claim 17 wherein the last interruption subroutine instruction is an interruption return instruction, A. said processor unit additionally comprising means responsive to the interruption return instruction for transferring the contents of the last two locations in the third memory block to said status register and said program counter, and
B. said modifying means being responsive to the interruption return instruction for causing said second register to identify a previously used address in the third memory block contiguous to the last two locations.

19. A data processing system as recited in claim 18 wherein said modifying means includes A. means for decrementing said second register contents before each transfer of said program counter contents and said status word register contents to the third memory block, and
B. means for incrementing said second register contents after each transfer to said status word register and to said program counter.

20. A data processing system comprising:

A. a memory unit including a plurality of addressed locations for storing first and second sets of instructions in first and second blocks of contiguous locations respectively, said second instruction sets constituting interruption routines,
B. a generator for generating interrupting signals including an address in the second memory block, and
C. a processor unit for processing instructions including
   1. a first register constituting a program counter for generating addresses of instructions sequentially to identify instructions to be transferred to said processor unit,
   2. a second register for defining third memory block locations,
   3. means responsive to an interrupting signal for modifying said second register to identify the next vacant contiguous third memory block location, and
   4. a transfer unit including means responsive to said interrupting signal generator for
      a. transferring said program counter contents to the location identified by said second register, and
      b. transferring the second memory block address to said program counter whereby said processor unit obtains an interruption subroutine instruction from the second memory block.

21. A data processing system as recited in claim 20 wherein the last interruption routine instruction is an interruption return instruction.

A. said transfer unit including means for transferring the program counter contents in the third memory block to said program counter, and
B. said modifying means being responsive to the interruption return instruction for causing said second register to identify the next occupied contiguous location in the third memory block.

22. A data processing system as recited in claim 20 additionally including a status word register, A. said interrupting signal generator additionally generating an address for a status word,
B. said transfer unit including means for transferring said status word register contents to a vacant location in the third memory block, and
C. said modifying means being responsive to said interrupting signal generator for causing said second register to identify the next two contiguous vacant locations in the third memory block for storing said status word register and said program counter contents.

23. A data processing system as recited in claim 22 wherein the last instruction in an interruption routine is an interruption return instruction, A. said transfer unit including means responsive to the return instruction for transferring the status word in the third memory block to the status word register and the program counter contents stored in the other third memory block location to said program counter, and
B. said modifying means being responsive to the interruption routine instruction for causing said register to identify the next-occupied contiguous location in the third memory block.

24. A data processing system as recited in claim 23 wherein said modifying means comprises:

A. means responsive to said interrupting signal generator for decrementing said second register, and B. means for incrementing said second register in response to a return instruction.

25. A method for causing a processor unit in a data processing system which is obtaining instructions from a first block of memory unit locations to obtain instructions from another block of locations wherein the processor unit includes a program counter for identifying instructions to be obtained, one instruction being a transfer instruction identifying a first register and a second memory block location, and a second register for identifying third memory block locations, said method comprising the steps of:

A. transferring the first register contents to the next vacant third memory block location identified by the second register, B. transferring the program counter contents to the first register, and C. transferring the second memory block address to the program counter.

26. A method as recited in claim 25 wherein the last location in the memory block contains a return instruction, said method being responsive to the return instruction by A. transferring the first register contents to the program counter, and B. transferring the contents of the next-occupied third memory block location to the first register.

27. A method as recited in claim 26 additionally comprising the step of modifying the second register contents in response to the transfer and return instructions for identifying the address of the last-occupied third memory block location to control transfers to and from the third memory block.

28. A method as recited in claim 27 wherein said modifying of the second register contents includes:

A. decrementing the second register before said transfer steps in response to the transfer instruction, and B. incrementing said second register after said transfer steps in response to the return instruction.

29. A method as recited in claim 28 wherein the processor unit includes a temporary register, said second memory block address transfer step including:

A. transferring the address of the second memory block location to the temporary register before said transfer step from the first register, and B. transferring the temporary register contents to the program counter after said transfer step from the program counter.

30. A method as recited in claim 29 wherein the transfer instruction, second memory block address and additional information are stored in contiguous locations in the first memory block, and the transfer instruction identifies the program counter to obtain the second memory address, said transfer step to the first register storing the information from the first memory block and said transfer step to said program counter storing the address for the second set of instructions.

31. A method as recited in claim 29 wherein the transfer instruction identifies the program counter as the first register and the contents of a location identified by the second register as a memory address, said transfer steps to the temporary register, from the first register and from the program counter causing the contents of the location identified by the second register and the program counter contents to be exchanged.

32. A method as recited in claim 29 wherein the processing system additionally comprises means for generating a plurality of interrupting signals each identifying an address in a fourth memory block, the fourth memory block containing an address for an interruption routine and a status word for storage in a status word register, said method responding to an interrupting signal by:

A. decrementing the second register,

B. transferring the program counter contents to the third memory block location identified by the second register, C. decrementing the second register, D. transferring the status register contents to the third memory block location identified by the second register.

33. A method as recited in claim 32 wherein each interruption routine terminates with an interrupt return instruction, said method responding to the return instruction by A. transferring the status word in the third memory block location identified by the second register to the status word register, B. incrementing the second register, C. transferring the contents of the third memory block location identified by the second register to the program counter, and D. incrementing the second register.